United States Patent [19]

Hojyo et al.

[11] Patent Number: 4,580,254

[45] Date of Patent: Apr. 1, 1986

[54] AUTOMATIC DISC SELECTION TYPE REPRODUCING APPARATUS

[75] Inventors: Shigeru Hojyo, Tachikawa; Yoshiaki Wada, Hino; Tsutomu Kojima; Toshiyuki Dateyama, both of Sagamihara; Yoshitaka Koseki, Hachioji, all of Japan

[73] Assignee: Victor Company of Japan, Ltd., Yokohama, Japan

[21] Appl. No.: 633,861

[22] Filed: Jul. 24, 1984

[30] Foreign Application Priority Data

Jul. 27, 1983 [JP] Japan ................... 58-137267
Sep. 14, 1983 [JP] Japan ................... 58-170124
Sep. 29, 1983 [JP] Japan ................... 58-151296[U]

[51] Int. Cl.$^4$ .................... G11B 17/28; G11B 17/30
[52] U.S. Cl. .................................... 369/39; 369/34
[58] Field of Search .................... 369/34, 36, 38, 39

[56] References Cited

U.S. PATENT DOCUMENTS

| | | | |
|---|---|---|---|
| 2,148,250 | 2/1939 | Wilber | 369/38 |
| 2,398,067 | 4/1946 | Winkler | 369/36 |
| 3,085,805 | 4/1963 | Bodenroder | 369/39 |
| 3,884,569 | 5/1975 | Hickey | 353/88 |

*Primary Examiner*—Steven L. Stephan

*Attorney, Agent, or Firm*—Roberts, Spiecens & Cohen

[57] ABSTRACT

An automatic disc selection type reproducing apparatus comprises a disc accommodating mechanism having disc accommodating portions for accommodating discs, and a reproducer part provided below and movable along the disc accommodating mechanism. The disc accommodating mechanism is substantially arranged horizontally, and the discs are accommodated within the disc accommodating portions in a vertical state where a disc surface of one disc opposes a disc surface of an adjacent disc. The reproducer part moves and stops at a position opposing a disc which is designated by designating an address of the disc accommodating portion which accommodates this disc. The reproducer part has a disc carrying mechanism for carrying the disc which assumes the vertical state, upwardly and downwardly between the disc accommodating mechanism and the reproducer part, while supporting a lower portion of an outer peripheral edge of the disc. The disc carrying mechanism supplies the disc from the disc accommodating portion to the reproducer part by use of the weight of the disc when playing the disc, and returns the disc into the disc accommodating portion by separating the disc from the reproducer part when the playing of the disc is completed.

4 Claims, 43 Drawing Figures

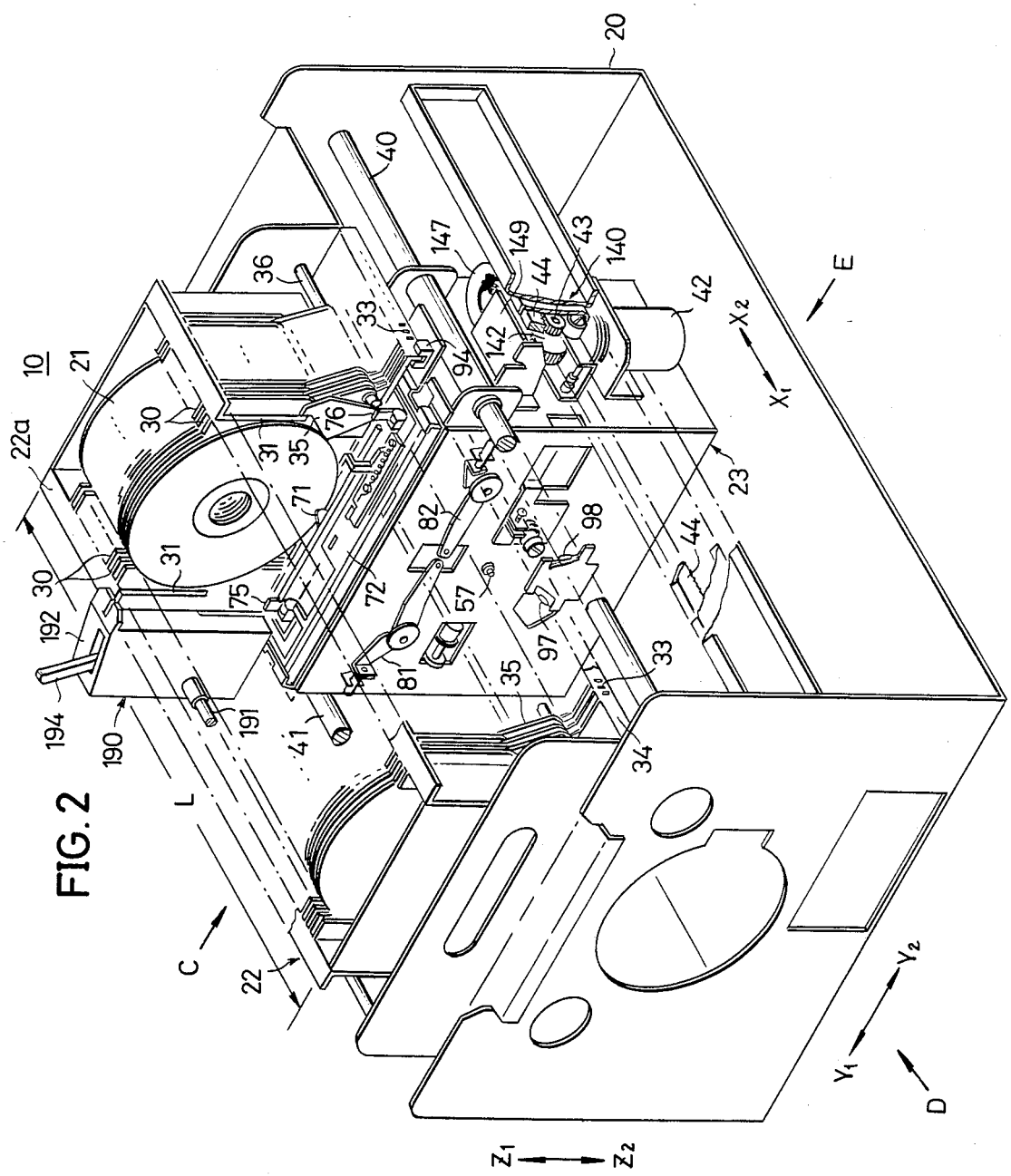

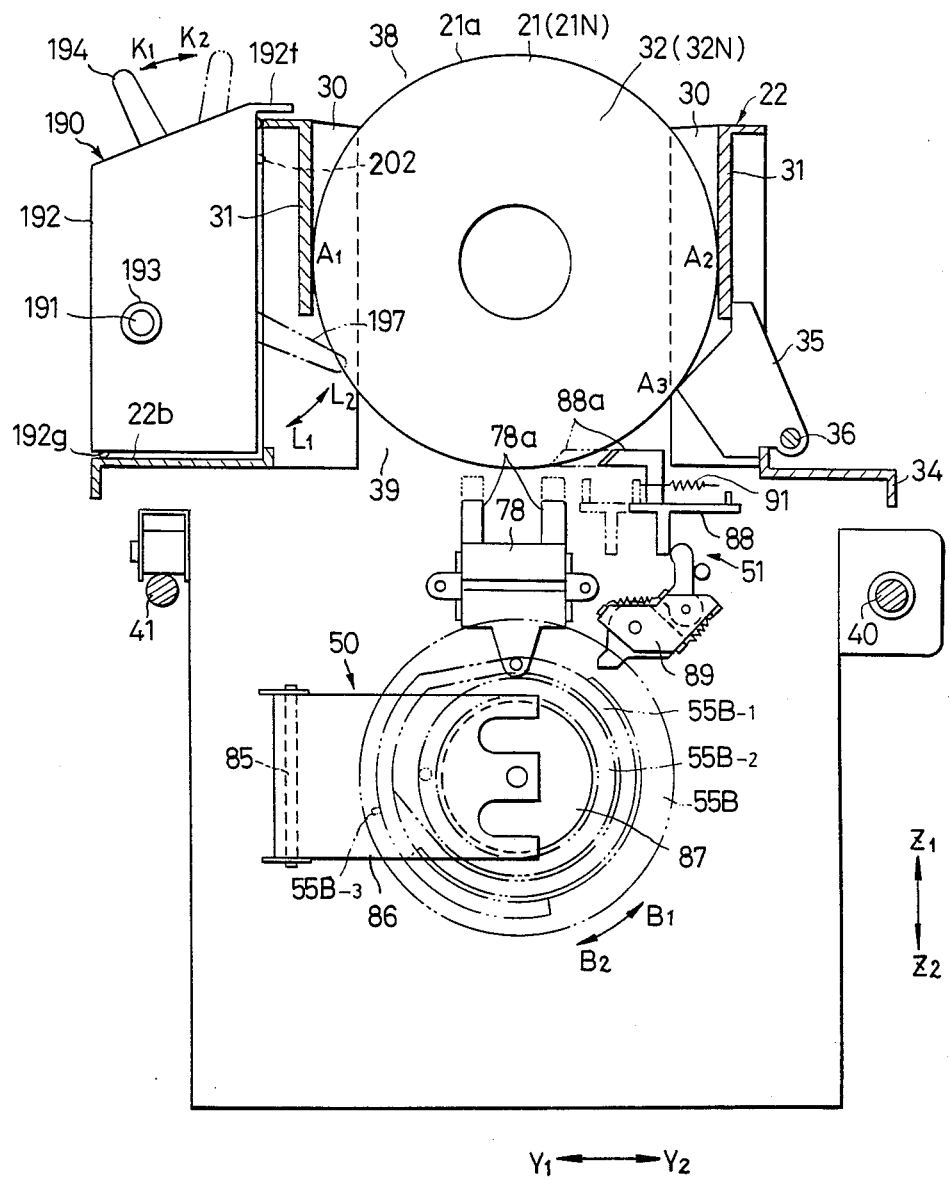

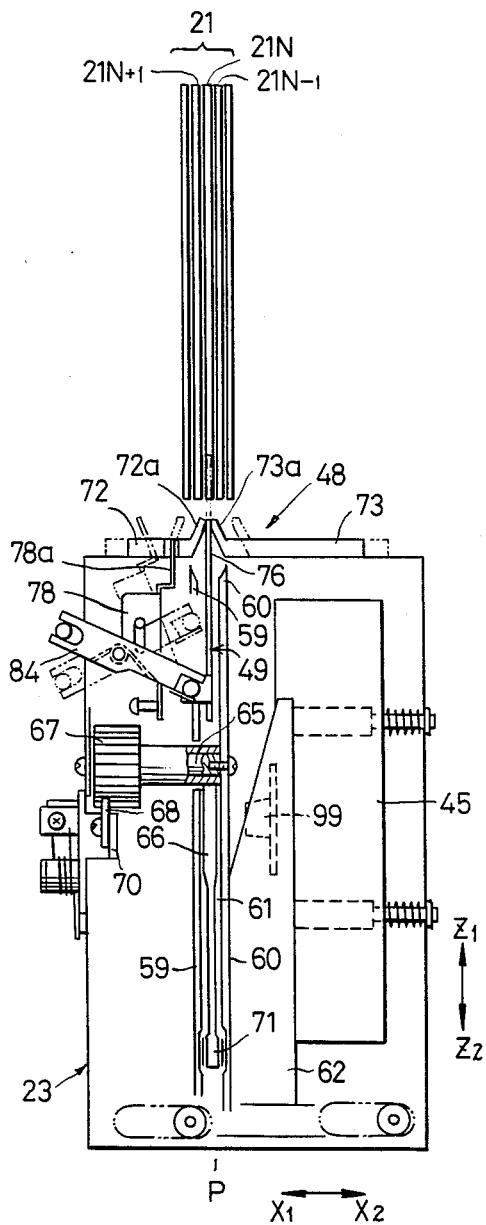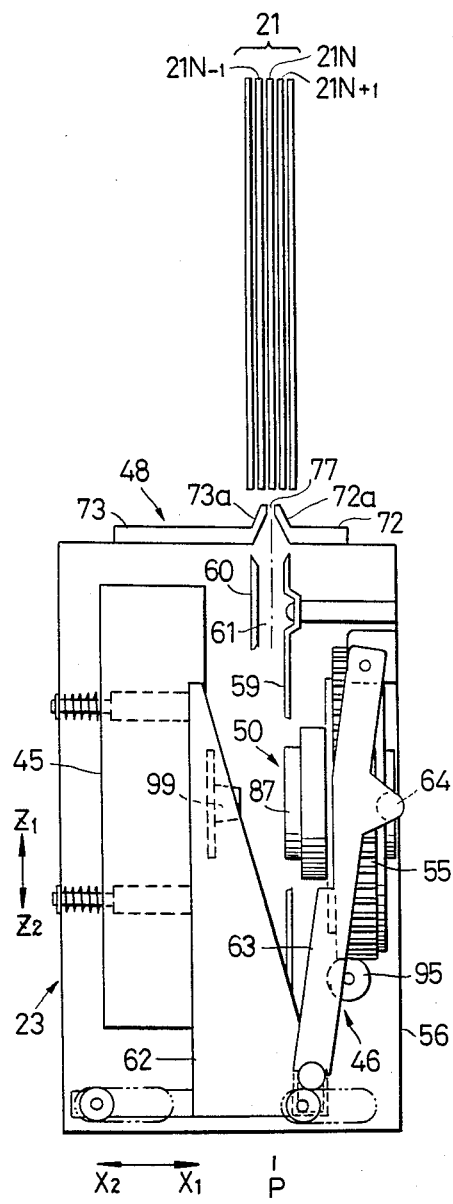

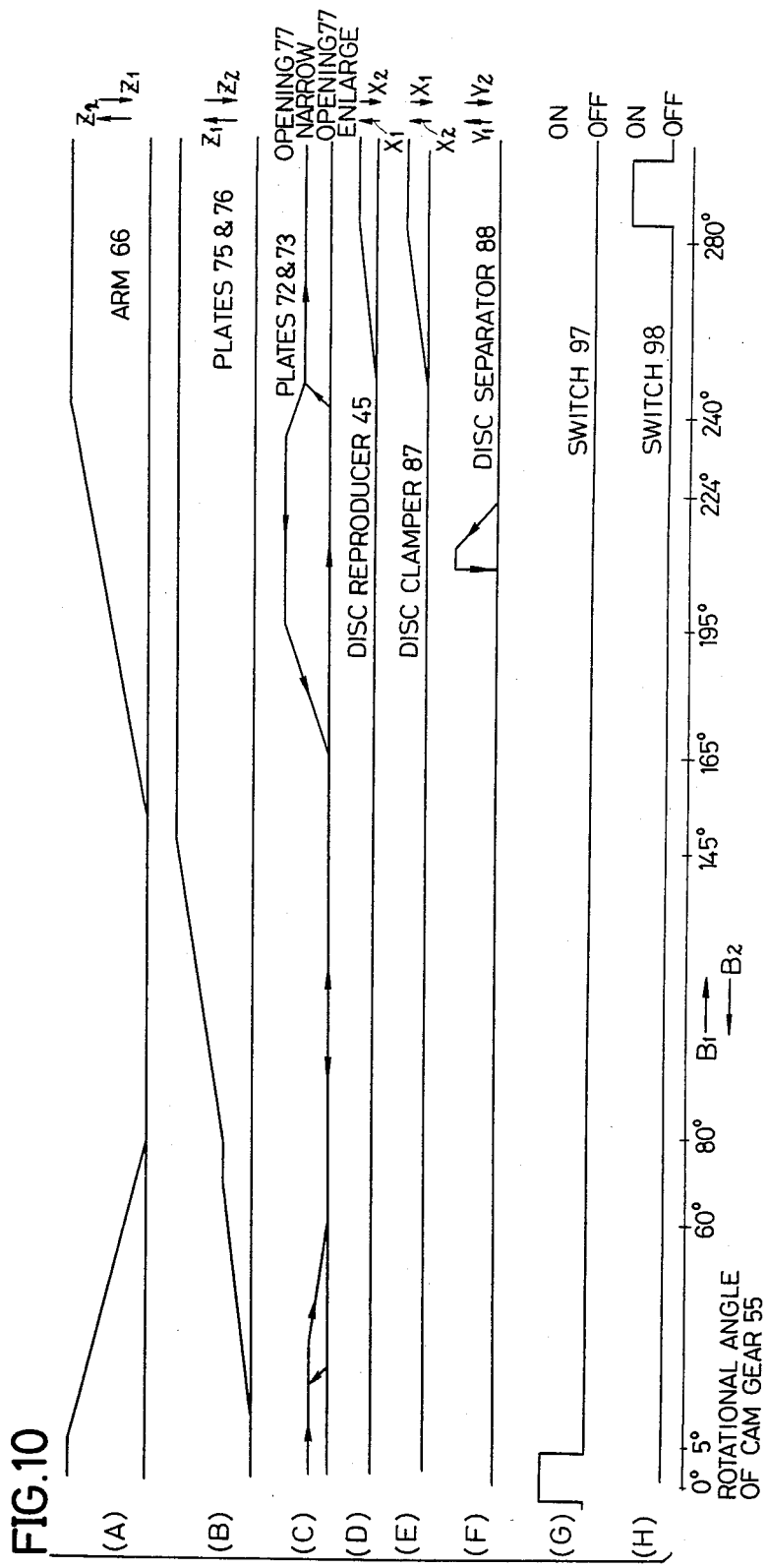

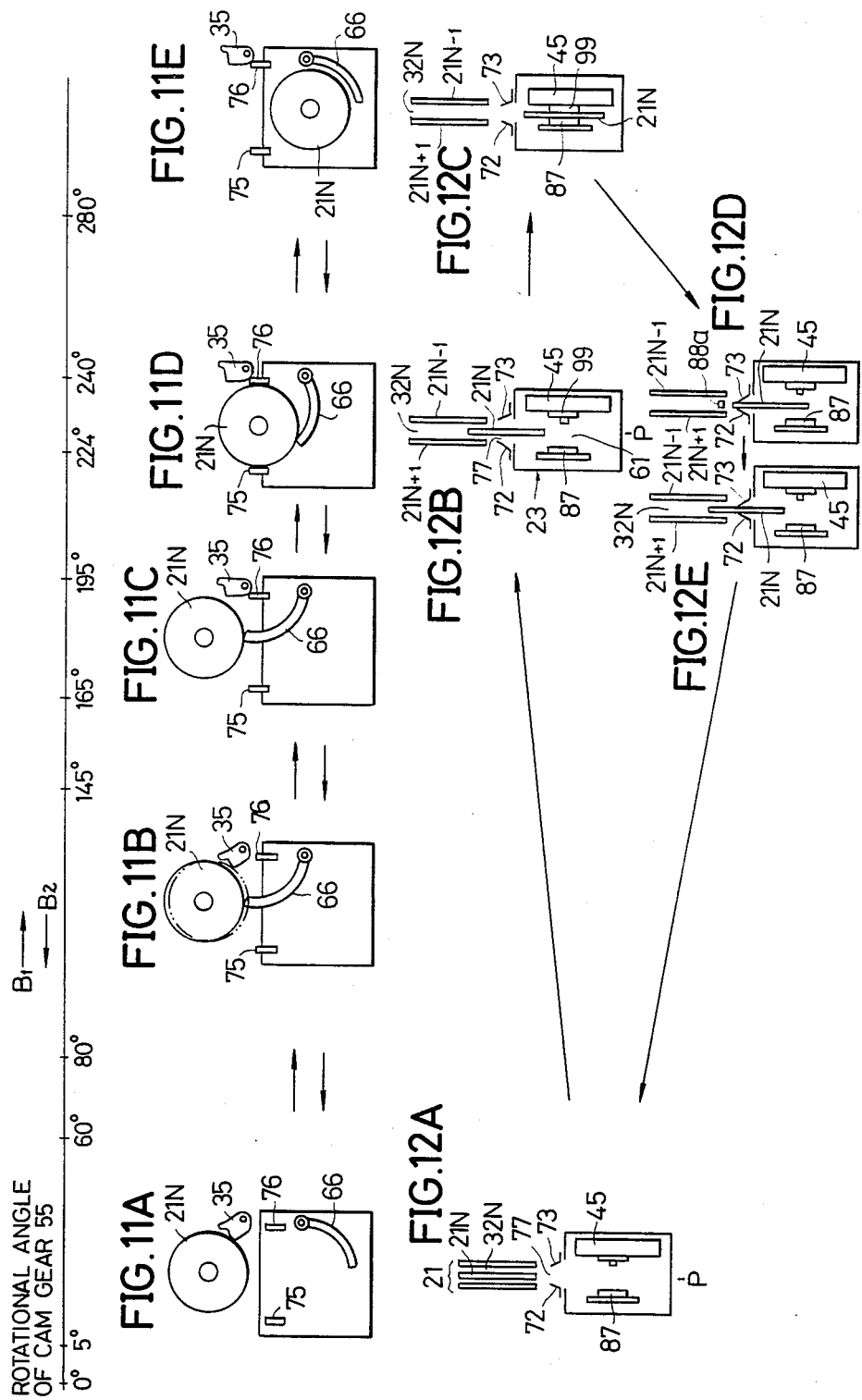

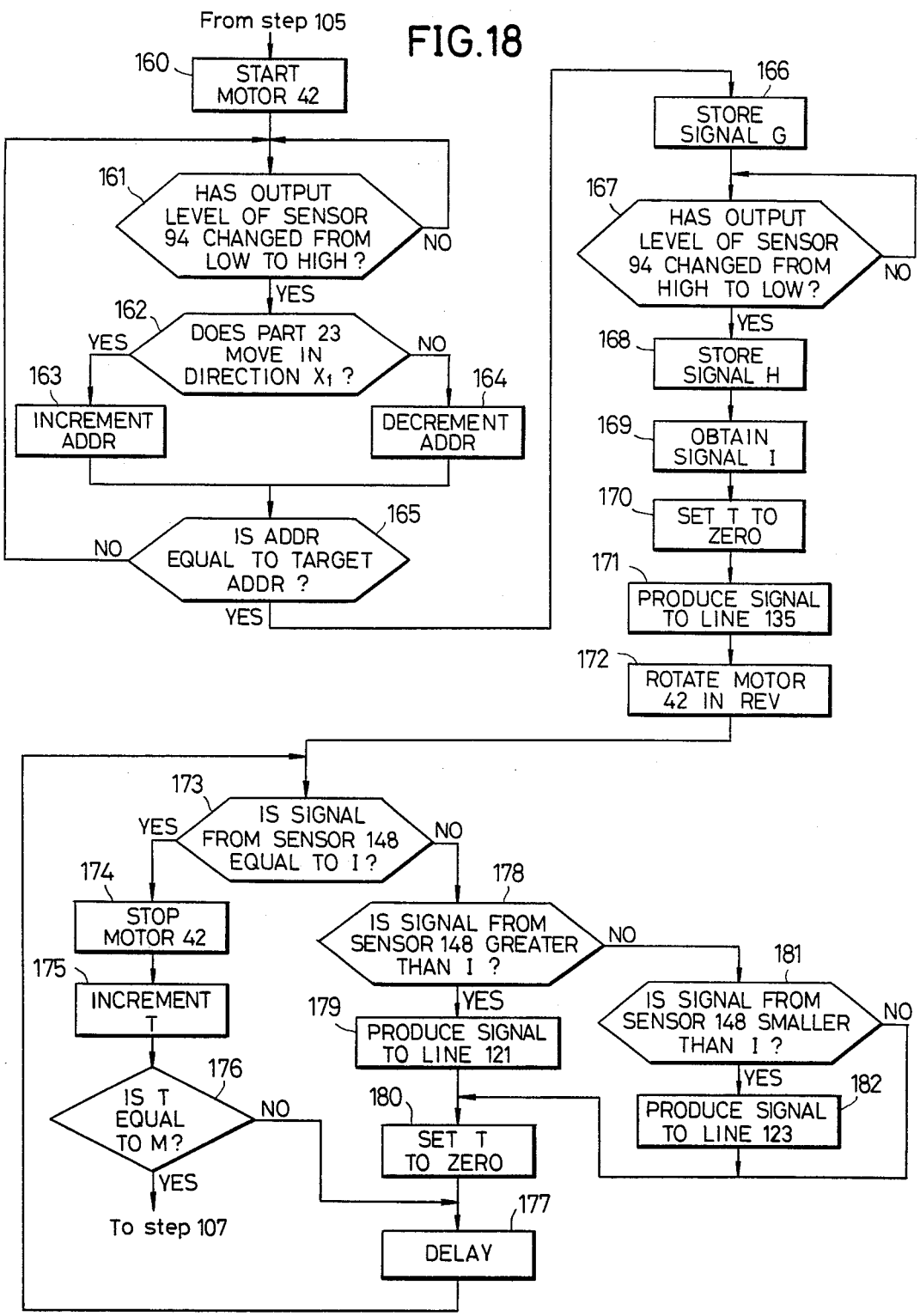

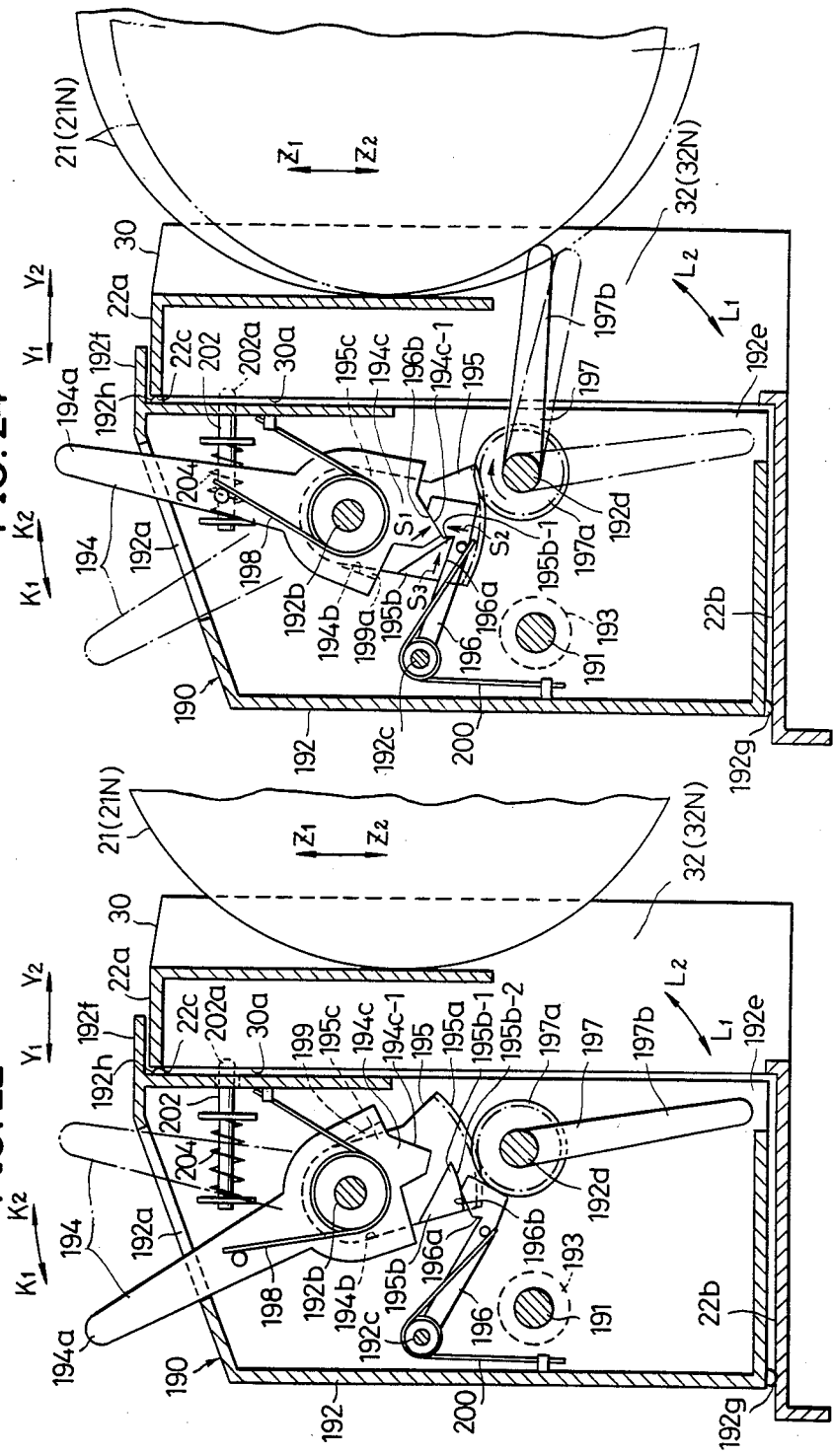
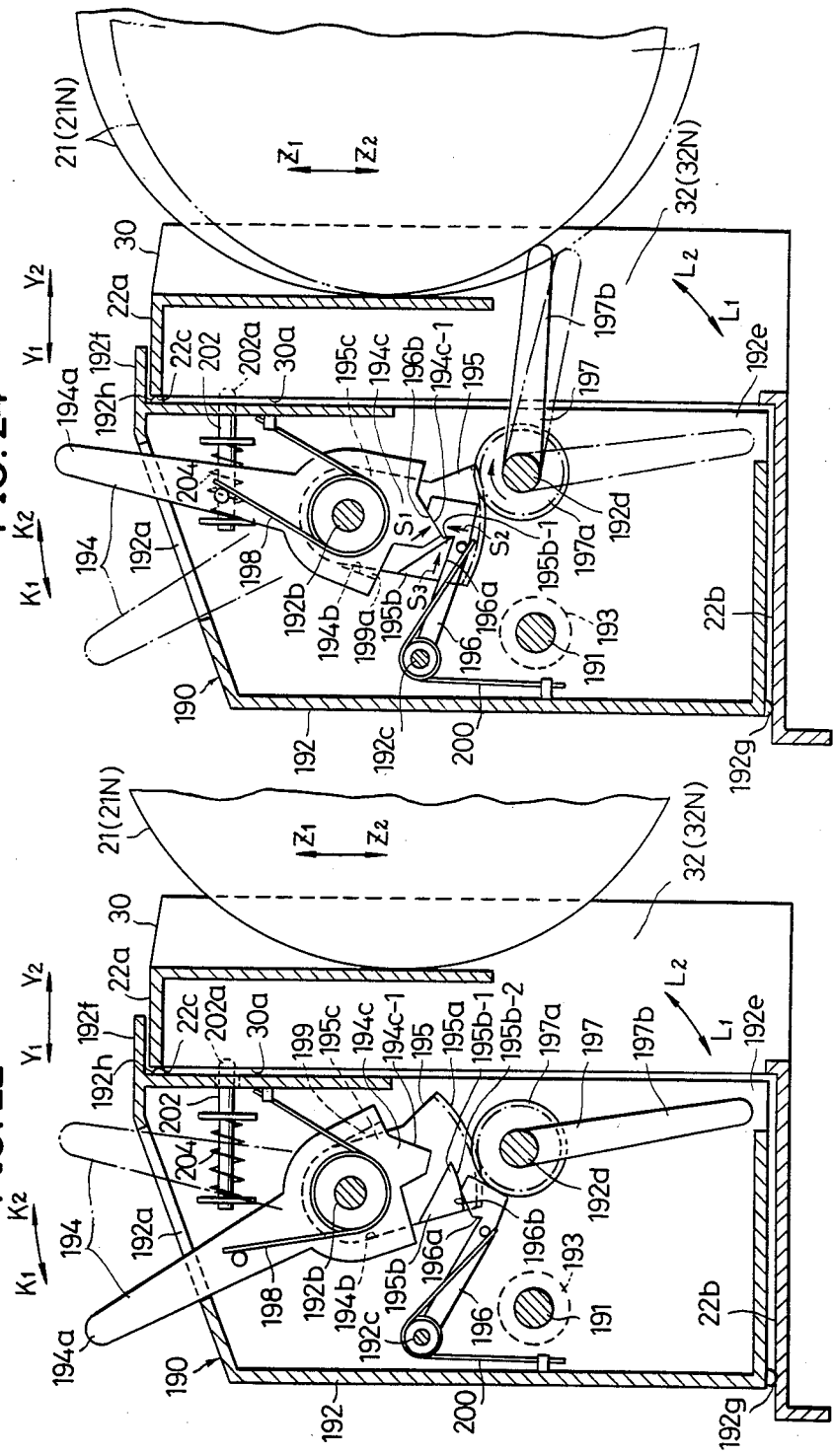

AUTOMATIC DISC SELECTION TYPE REPRODUCING APPARATUS

BACKGROUND OF THE INVENTION

The present invention generally relates to automatic disc selection type reproducing apparatus, and more particularly to a reproducing apparatus which automatically selects one disc from among a plurality of discs accommodated within an accommodating mechanism part of the reproducing apparatus.

As an automatic disc selection type reproducing apparatus, there is the so-called juke box. In the juke box, a plurality of record discs are arranged horizontally within an accommodating rack, in a state where the recording surfaces of the record discs face the recording surfaces of the respective adjacent record discs. A main player body moves along the side of the accommodating rack, and stops at a position opposing a record disc which is designated and is to be played. An arm member rotates in one direction and extracts the designated record disc, and loads this disc on the main player body to be played. After the record disc is played, the arm member rotates in a direction opposite to the above one direction so as to unload the record disc from the main player body and return the record disc back to the original position within the accommodating rack.

However, in such a juke box, the main player body is disposed to the side of the accommodating rack, and the arm member which is designed to hold the outer peripheral edge of the record disc must move partly within the accommodating rack. For this reason, there must be a sufficient gap between two adjacent discs which are accommodated within the accommodating rack, so that the arm member can move between two discs and extract or insert the record disc from or into the position between the two discs. As a result, the pitch with which the record discs are accommodated within the accommodating rack is large, and the number of record discs which can be accommodated within the accommodating rack having a predetermined length is small. In other words, the record disc accommodating capacity of the accommodating rack is small. On the other hand, when the number of record discs to be accommodated within the accommodating rack is fixed to a large number, the length of the accommodating rack becomes large, and it is difficult to downsize the juke box. In addition, since the arm member is designed to hold the outer peripheral edge of the record disc and move the record disc between the accommodating rack and the main player body, the construction of the juke box as a whole is complex.

SUMMARY OF THE INVENTION

Accordingly, it is a general object of the present invention to provide a novel and useful automatic disc selection type reproducing apparatus in which the problems described heretofore have been eliminated.

Another and more specific object of the present invention is to provide an automatic disc selection type reproducing apparatus in which a disc accommodating mechanism part for accommodating a plurality of discs arranged horizontally in a state where the recording surfaces of the disc oppose the recording surfaces of the respective adjacent discs, is disposed in the upper part of the apparatus, and a reproducer is disposed in the lower part of the apparatus. The disc is moved vertically between the disc accommodating mechanism part and the reproducer. A disc carrying mechanism is designed to simply support a lower portion of the outer peripheral edge of the disc, and the disc is supplied to the reproducer by use of the weight of the disc itself. According to the apparatus of the present invention, the disc carrying mechanism only operates below the disc accommodating mechanism part, and does not enter or traverse the disc accommodating mechanism part when extracting or returning the disc from or into the disc accommodating mechanism part. Hence, it is unnecessary to provide a predetermined gap between the adjacent discs which are accommodated within the disc accommodating mechanism part so that the disc carrying mechanism can enter between two discs to extract or return a disc from or into the position between the two discs. As a result, it is possible to accommodate a plurality of discs within the disc accommodating mechanism part with a small pitch. Thus, the length of the disc accommodating mechanism part can be reduced, and the overall size of the apparatus can be reduced. In addition, because the disc carrying mechanism is designed to simply support the lower portion of the outer peripheral edge of the disc, the construction is simple compared to a mechanism which is designed to clamp the outer peripheral edge of the disc.

Still another object of the present invention is to provide an automatic disc selection type reproducing apparatus in which a stopping member for making contact with the outer periphery of the disc and for holding the disc within an accommodating portion of the disc accommodating mechanism part, is designed to move within a plane which is an extension of the accommodating portion. According to the apparatus of the present invention, the stopping member can be disposed within the accommodating portion without increasing the pitch of the accommodating portions. As a result, the disc accommodating mechanism part can be made compact, with the accommodating portions arranged with a small pitch.

A further object of the present invention is to provide an automatic disc selection type reproducing apparatus in which slits are formed in correspondence with each of the accommodating portions making up the disc accommodating mechanism part, and the reproducer is designed to stop at a position located at the center of the slit in the width direction of the slit. According to the apparatus of the present invention, it is possible to prevent a wrong disc from being extracted erroneously from an accommodating portion which is adjacent to the accommodating portion which actually accommodates the disc which is to be played, even when the accommodating portions are arranged with a small pitch. Hence, it is possible to prevent a wrong disc from being played, and the designated disc can be positively played. Further, the disc which is played can be positively returned to the original accommodating portion.

Another object of the present invention is to provide an automatic disc selection type reproducing apparatus which further has a mechanism for pushing upwardly an arbitrary disc among the plurality of discs accommodated within the disc accommodating mechanism part, when the arbitrary disc is to be removed and replaced with another disc. According to the apparatus of the present invention, the disc which is to be changed can be removed with ease since the upper portion of the disc projects upwardly from the disc accommodating mechanism part, even when the discs are arranged close together within the disc accommodating mechanism part.

Other objects and further features of the present invention will be apparent from the following detailed description when read in conjunction with the accompanying drawings.

BRIEF DESCRIPTION OF THE DRAWINGS

FIG. 2 is a perspective view showing a main apparatus body of the automatic disc selection type compact disc reproducing apparatus shown in FIG. 1 with an outer cover removed;

FIGS. 4 and 5 each show the construction of a disc accommodating rack and a reproducer part viewed from the direction of an arrow C in FIG. 2, where FIG. 4 shows a mechanism which is operated by one cam surface of a cam gear and FIG. 5 shows a mechanism which is operated by the other cam surface of the cam gear;

FIGS. 6 and 7 mainly show the construction of the reproducer part viewed from the direction of arrows D and E in FIG. 2, respectively;

FIGS. 10(A) shows the operating state of the of a disc carrying arm, FIG. 10(B) shows the operating states of positioning plates, FIG. 10(C) shows the operating states of disc guide plates, FIG. 10(D) shows the operating state of a disc reproducer, FIG. 10(E) shows the operating state of disc clamper, FIG. 10(F) shows the operating state of a disc separator, FIG. 10(G) shows the operating state of an initial reed switch, and FIG. 10(H) shows the operating state of a return reed switch, in correspondence with the rotational angle of the cam gear 55;

FIGS. 11A through 11E and FIGS. 12A through 12E respectively show operating states of the reproducing apparatus in correspondence with the rotational angles of the cam gear;

FIG. 18 is a flow chart for explaining the operation of the microcomputer when positioning the first sensor at the center of the desired slit;

FIGS. 22 and 24 are cross sectional views viewed from the direction of an arrow D in FIGS. 20 and 21, in a state before the disc removing mechanism is operated and in a state when the disc removing mechanism is operated.

DETAILED DESCRIPTION

Figure 1:
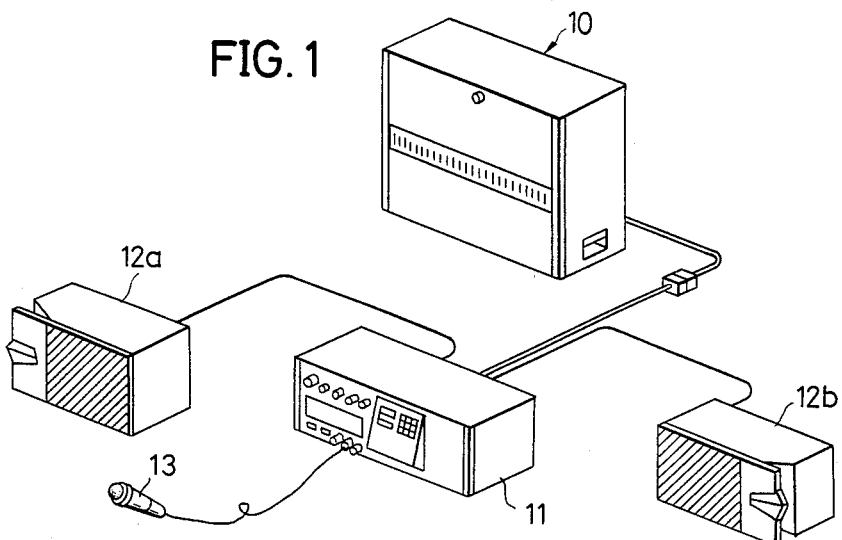
FIG. 1 shows an example of a system including an automatic disc selection type compact disc reproducing apparatus which is an embodiment of an automatic disc selection type reproducing apparatus according to the present invention.

An automatic disc selection type compact disc reproducing apparatus (hereinafter simply referred to as a reproducing apparatus) 10 shown in FIG. 1, is an embodiment of an automatic disc selection type reproducing apparatus according to the present invention. The reproducing apparatus 10 operates in response to a designating signal related to an address of the location of a disc which is to be played. The designating sigal is produced from an operating box 11 by manipulating a key of the operating box 11. In other words, the reproducing apparatus 10 plays the disc which is accommodated within a disc accommodating portion, responsive to the designating signal. Signals which are reproduced from the disc are generated as sounds through a pair of speakers 12a and 12b. The system shown in FIG. 1 is used as an apparatus with which a person sings into a microphone 13 to the accompaniment of the music which is generated through the speakers 12a and 12b.

FIG. 2 shows the construction of a main apparatus body of the reproducing apparatus 10. The reproducing apparatus 10 generally comprises a frame 20, a disc accommodating rack 22, and a reproducer part 23. The rack 22 is mounted across the upper part of the frame 20, and accommodates a plurality of compact discs (hereinafter simply referred to as a disc) 21. The reproducer part 23 has a reproducer built therein, and is located immediately below the rack 22. The reproducer part 23 is movable along the rack 22.

Figure 3:
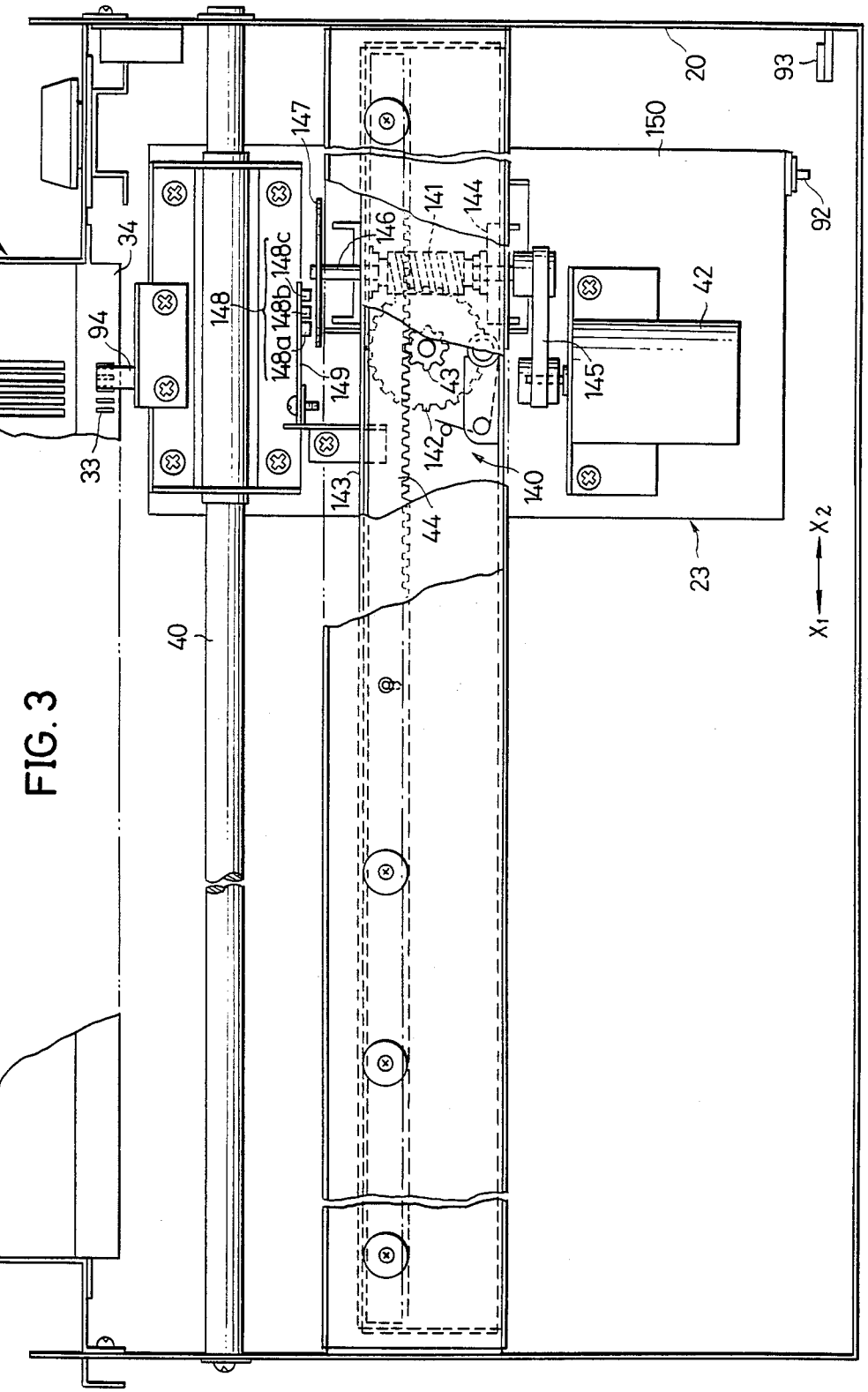
FIG. 3 is a front view, with a part cut away, showing the main apparatus body shown in FIG. 2 viewed from the direction of an arrow E.
Figure 4:
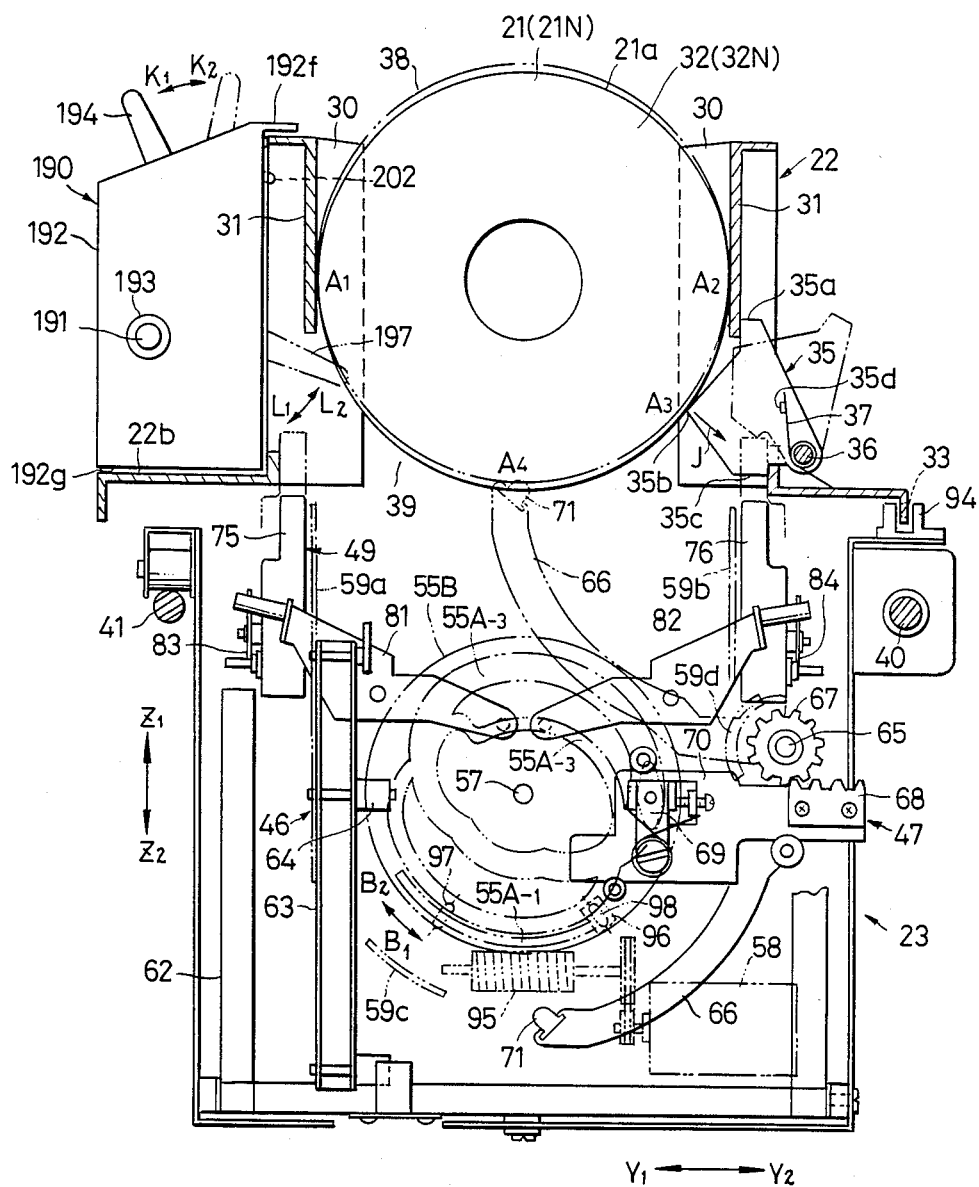

As shown in FIGS. 3 and 4, the rack 22 substantially has a rectangular frame shape. A plurality of partitions 30 are connected to the side plates 31 of the rack 22. A first pair of mutually opposing partitions 30 and a second pair of mutually opposing partitions 30 which is adjacent to the first pair, cooperate and form a flat disc accommodating portion 32. A plurality of disc accommodating portions 32 are arranged in the longitudinal direction of the rack 22. For example, 100 disc accommodating portions 32 are arranged in the longitudinal direction of the rack 22, and an address is sequentially given to each of the disc accommodating portions 32. Central parts of mutually adjacent disc accommodating portions 32 are communicated with each other. A slit plate 34 is fixed to the rack 22. Slits 33 are formed in the slit plate 34, in correspondence with each of the disc accommodating portions 32. A disc stopper 35 is provided for each disc accommodating portion 32. The disc stopper 35 is supported by a pin 36, and is disposed between two mutually adjacent partitions 30. The disc stopper 35 is urged to rotate counterclockwise by a spring 37. Normally, the disc stopper 35 assumes a state where the disc stopper 35 is rotated counterclockwise, and projects within the disc accommodating portion 32. The top and bottom of the rack 22 are formed as openings 38 and 39, respectively.

The disc 21 is inserted into the disc accommodating portion 32 through the upper opening 38, in a vertical state where the recording surface of the disc 21 is facing a predetermined direction. An outer peripheral edge 21a of the inserted disc 21 is held at two points A1 and A2 by the side plates 31, and is prevented from rolling. Further, the disc 21 is held at a lower point A3 by the disc stopper 35, and is prevented from moving downwardly, that is, prevented from falling. Moreover, the partitions 30 positively separate the disc 21 from an adjacent disc 21, and restrict the deviation of the disc 21 from the vertical state so that the disc 21 does not make contact with the adjacent disc 21. A plurality of discs 21 are accommodated within the rack 22 in this manner, in a state where the discs 21 assume the vertical states and oppose the mutually adjacent disc 21. Hence, when the stopping of the disc 21 by the disc stopper 35 is cancelled, the disc 21 will fall due to its own weight. In other words, the discs 21 are accommodated within the rack 22 in a state where the discs 21 can escape from the accommodating portions 32 through the bottom opening 39, when the stopping of the discs 21 by the corresponding disc stoppers 35 are cancelled.

A disc carrying arm 66 which will be described later on in the specification, does not move within the rack 22. Hence, it is unnecessary to provide a predetermined gap between the adjacent discs 21 which are accommodated within the disc accommodating portions 32 so that the disc carrying arm 66 can enter between two discs 21 to extract or return one disc 21 from or into the position between the two discs 21. In addition, the thickness of the disc stopper 35 is smaller than the thickness of the disc 21, and for this reason, the disc accommodating portions 32 are arranged with a small pitch. In the present embodiment, each partition 30 has a thickness of approximately 1 mm, and the pitch of the partitions 30 is approximately 3 mm. The disc accommodating portions 32 are arranged with a small pitch of 4 mm. Therefore, even when 100 discs 21 are to be accommodated within the rack 22, the length L of the rack 22 need only be approximately equal to 30 cm, and the reproducing apparatus 10 can be made compact.

Both sides of the reproducer part 23 are supported by a pair of guide rods 40 and 41 which are disposed across the frame 20. A motor 42 rotates a pinion 43, and the pinion 43 rolls over a rack 44. Thus, the reproducer part 23 is movable in the directions of arrows X1 and X2 under the guidance of the guide rods 40 and 41.

As shown in FIGS. 2 through 8, the reproducer part 23 comprises a disc reproducer 45, a shifting mechanism 46 for shifting the disc reproducer 45, a disc carrying mechanism 47 for supporting the disc 21 and for carrying the disc 21 between the rack 22 and the reproducer part 23, a disc guide mechanism 48 for guiding the disc 21 which is ejected from the reproducer part 23, a positioning mechanism 49 for positioning the disc guide mechanism 48 to a predetermined disc accommodating portion 32 of the rack 22, a disc clamping mechanism 50 for clamping the disc 21 at the time of the reproduction, a disc separating mechanism 51 for mutually separating discs 21 accommodated within the disc accommodating portion 32 which are adjacent to one disc accommodating portion 32 when returning the disc 21 into this one disc accommodating portion 32, and the like. The mechanisms of the reproducer part 23, are each operated in relation to the rotation of a single cam gear 55 shown in FIGS. 4, 5, and 9A through 9C. The cam gear 55 is supported by a shaft 57 within an outer panel 56 of the reproducer part 23, substantially at a center position viewed from the direction of the arrow D. The cam gear 55 is supported in a state where a cam surface 55A shown in FIG. 9C faces outwardly of the reproducer part 23 and a cam surface 55B faces inwardly of the reproducer part 23. FIG. 4 shows the mechanisms which are operated by the cam surface 55A of the cam gear 55. The cam gear 55 is rotated by a loading motor 58. FIG. 5 shows the mechanisms which are operated by the cam surface 55B of the cam gear 55.

A pair of mutually opposing guide panels 59 and 60 are provided in the reproducer part 23, on both sides of a disc receiving/ejecting position P as shown in FIGS. 6 and 7. The disc 21 is inserted into a flat space 61 between the guide panels 59 and 60, and is rotated when the disc 21 is played.

The disc reproducer 45 is movable within the reproducer part 23, in the directions of the arrows X1 and X2. In an initial state, the disc reproducer 45 is moved in the direction of the arrow X2, and is separated from the position P as shown in FIGS. 6 and 7.

As shown in FIGS. 4 and 7, the shifting mechanism 46 comprises a shift arm 63 and a cam 55A-1. The upper part of the shift arm 63 is pivotally supported by a part of the outer panel 56, and the lower part of the shift arm 63 is coupled to a U-shaped support base 62 which supports the disc reproducer 45. The cam 55A-1 is formed on the cam surface 55A, and acts on a roller 64 which is located at an intermediate point on the shift arm 63. The disc reproducer 45 operates after the disc 21 enters within the disc reproducer 45.

Figure 9A:
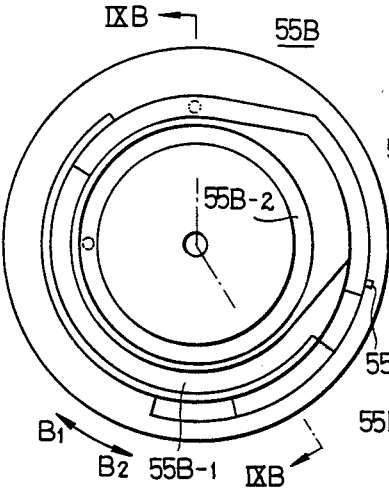
FIGS. 9A and 9C respectively show the shapes of cam surfaces of the cam gear.
Figure 9B:
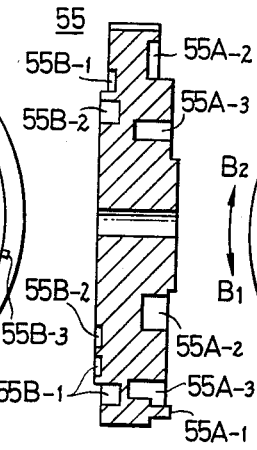
FIG. 9B shows a cross section along a line IXB—IXB in FIGS. 9A and 9C.
Figure 9C:
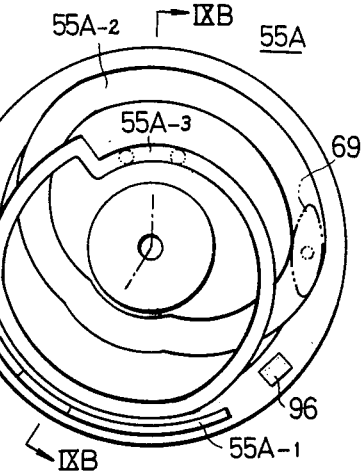

The disc carrying mechanism 47 comprises the substantially arcuate disc carrying arm 66, a pinion 67 which is integrally formed on the disc carrying arm 66, and a lever 70 as shown in FIGS. 4 and 6. A rack 68 which meshes with the pinion 67, is located on one end of the lever 70. The disc carrying arm 66 rotates within the flat space 61 about a shaft 65, between a position indicated by a solid line in FIG. 4 and a position indicated by a two-dot chain line in FIG. 4. A cam follower 69 of the lever 70 is guided by a cam groove 55A-2 of the cam surface 55A as shown in FIGS. 4 and 9C, and the lever 70 moves in the directions of arrows Y1 and Y2. In the initial state, the lever 70 is moved in the direction of the arrow Y2 as shown in FIG. 4, and the disc carrying arm 66 is rotated counterclockwise. A substantially U-shaped disc catcher 71 is mounted on the tip end of the disc carrying arm 66. The disc catcher 71 simply supports the outer peripheral edge 21a of the disc 21 in a state where the disc 21 is restricted from free displacement in the surface direction of the disc 21.

Figure 8:
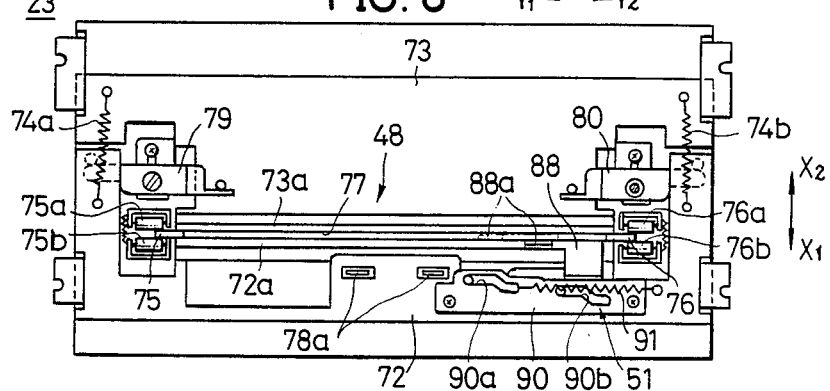
FIG. 8 is a plan view showing the reproducer part.

The disc guide mechanism 48 comprises a pair of guide plates 72 and 73 shown in FIGS. 6 through 8. Sloping guide parts 72a and 73a of the respective guide plates 72 and 73 oppose each other. The guide plates 72 and 73 are urged to close upon each other by springs 74a and 74b which are located on both sides of the disc guide mechanism 48. The sloping guide parts 72a and 73a oppose each other through positioning plates 75 and 76 which are located on both sides of the disc guide mechanism 48. In this state, the sloping guide parts 72a and 73a for an inverted V-shaped in the side view, and can guide the disc 21 which is ejected upwardly. In addition, a narrow opening 77 is formed between the tip ends of the sloping guide parts 72a and 73a, where the width of the opening 77 is slightly larger than the thickness of the disc 21. An enlarging lever 78 undergoes a rotational displacement as indicated by a two-dot chain line in FIG. 6 under the guidance of a cam groove 55B-1 of the cam surface 55B. The guide plate 72 is engageable by an arm part 78a of the enlarging lever 78 and is displaceable in the direction of the arrow X1. When the guide plate 72 is displaced in the direction of the arrow X1, the other guide plate 73 is displaced in the direction of the arrow X2 by way of levers 79 and 80 which are located on both sides of the disc guide mechanism 48. In other words, the guide plates 72 and 73 are displaced in directions so as to separate from each other, and widen the opening 77 so that the disc 21 can easily enter within the reproducer part 23. In addition, the guide plates 72 and 73 are mounted with a certain degree of freedom so that the guide plates 72 and 73 can undergo slight horizontal displacement without widening the opening 77. The positioning plates 75 and 76 are resiliently supported between respective rollers 75a and 75b and rollers 76a and 76b and can undergo slight displacement, and the guide plates 72 and 73 are displaced according to the positions of the positioning plates 75 and 76.

The positioning mechanism 49 comprises on both sides of the opening 77, the positioning plates 75 and 76 which are movable in the directions of arrows Z1 and Z2, rotary arms 81 and 82 which are guided by a cam groove 55A-3 of the cam surface 55A, and coupling arms 83 and 84 which couple the rotary arms 81 and 82 with the respective positioning plates 75 and 76. In the initial state, the positioning plates 75 and 76 are displaced in the direction of the arrow Z2, and are receded within the reproducer part 23. When the cam gear 55 rotates, the positioning plates 75 and 76 simultaneously move in the direction of the arrow Z1. The positioning plate 75 is moved by way of the rotary arm 81 and the coupling arm 83, while the positioning plate 76 is moved by way of the rotary arm 82 and the coupling arm 84. Thus, the positioning plates 75 and 76 project upwardly from the reproducer part 23 and enter within the rack 22. The positioning plates 75 and 76 each have a thickness which is slightly larger than the thickness of the disc 21, and determine the width of the opening 77 when guiding the disc 21.

The disc clamping mechanism 50 comprises a clamping arm 86 which has a base part thereof pivotally supported by a shaft 85, a disc clamper 87 located at the tip end part of the clamping arm 86, and a cam groove 55B-2 of the cam surface 55B, as shown in FIGS. 5 and 7. When clamping the disc 21, the cam groove 55B-2 causes the clamping arm 86 to rotate and displaces the disc clamper 87 in the direction of the arrow X2 in FIG. 7. In the initial state, the disc clamper 87 is displaced in the direction of the arrow X1 and assumes a non-clamping position.

The disc separating mechanism 51 comprises a disc separator 88 located on the guide plate 72, and a rotary arm assembly 89, as shown in FIGS. 5 and 8. The rotary arm assembly 89 is kicked and rotated by a projection 55B-3 of the cam surface 55B, and displaces the disc separator 88 in the direction of the arrow Y1. When the disc separator 88 moves in the direction of the arrow Y1, a separating part 88a enters between two discs 21 in the vicinity of the lower edge of the discs 21, so as to forcibly separate the two discs 21 and form a path for the disc 21 which is to be returned between the two discs 21 within the rack 22. The disc separator 88 can undergo a displacement under the guidance of a curved longitudinal holes 90a and 90b in a plate 90. Normally, the disc separator 88 is moved in the direction of the arrow Y2 by the action of a spring 91. When the rotary arm assembly 89 is kicked by the projection 55B-3 as the cam gear 55 rotates in the direction of an arrow B1, the rotary arm assembly 89 itself bends and does not rotate.

However, the rotary arm assembly 89 is designed to rotate counterclockwise when kicked by the projection 55B-3 as the cam gear 55 rotated in the direction of an arrow B2.

Next, description will be given with respect to the operation of the reproducing apparatus 10 having the construction described heretofore, by referring to FIGS. 10(A) through 10(F), 11A through 11E, and 12A through 12E.

FIG. 10(A) shows operating state of the disc carrying arm 66, FIG. 10(B) shows the operating states of the positioning plates 75 and 76, FIG. 10(C) shows the operating states of the disc guide plates 72 and 73, FIG. 10(D) shows the operating state of the disc reproducer 45, FIG. 10(E) shows the operating state of the disc clamper 87, FIG. 10(F) shows the operating state of the disc separator 88, FIG. 10(G) shows the operating state of an initial reed switch 97, and FIG. 10(H) shows the operating state of a return reed switch 98, in correspondence with the rotational angle of the cam gear 55. FIGS. 11A through 11E and FIGS. 12A through 12E respectively show operating states of the reproducing apparatus 10 in correspondence with the rotational angles of the cam gear 55.

In the initial state, the reproducing apparatus 10 assumes the state shown in FIGS. 11A and 12A. In this initial state, the disc 21 is stopped by the disc stopper 35, the disc carrying arm 66 is rotated counterclockwise, and the positioning plates 75 and 76 are moved downwardly. The disc reproducer 45 and the disc clamper 87 are both separated from the position P. Further, the disc guide plates 72 and 73 are mutually separated, and the opening 77 is in a semi-open state.

When the power source of the reproducing apparatus 10 is turned ON, the motor 42 starts to rotate. The reproducer part 23 moves in the direction of the arrow X2, and stops at a waiting position where an optical initial sensor 92 shown in FIG. 3 detects a reflecting plate 93.

When the operating box 11 is operated and the disc accommodating portion 32 which accommodates a disc $21_N$ to be played is designated, the reproducing apparatus 10 operates in the following manner. That is, when the operator designates a predetermined address N, the motor 42 starts to rotate, and the pinion 43 rolls over the rack 44. The reproducer part 23 is guided by the guide rods 40 and 41 and moves in the direction of the arrow X1. The reproducer part 23 stops at a position where a slit detector 94 detects the slit 33 which corresponds to the predetermined address N. In other words, the reproducer part 23 stops at the disc receiving/ejecting position P immediately below the disc $21_N$ which is accommodated within a disc accommodating portion $32_N$ having the designated predetermined address N. The mechanisms for stopping the reproducer part 23 with a high precision, will be described later on in the specification.

Next, the loading motor 58 starts to rotate in the forward direction, and the cam gear 55 rotated in the direction of the arrow B1 through a worm 95, from an initial position (see FIG. 10(G)) where a magnet piece 96 embedded in the cam gear 55 turns ON the initial reed switch 97. The cam gear 55 rotates over approximately 280° up to a position where the magnet piece 96 turns ON the return reed switch 98. As the cam gear 55 rotates, the lever 70 moves in the direction of the arrow Y1 in FIG. 4, and the disc carrying arm 66 rotates clockwise up to a position indicated by a two-dot chain line in FIG. 4 as may be seen from FIG. 10(A). The disc catcher 71 catches a lower end portion A4 of the outer peripheral edge 21a of the disc $21_N$ which is accommodated within the disc accommodating portion $32_N$ of the rack 22, and lifts the disc $21_N$ slightly as indicated by a two-dot chain line FIG. 4 and as indicated by the solid line in FIG. 11B, so that the disc $21_N$ is slightly separated from the disc stopper 35. In addition, the rotary arm 81 rotates counterclockwise and the rotary arm 82 rotates clockwise. The positioning plates 75 and 76 both move in the direction of the arrow Z1 and are raised, as may be seen from FIG. 10(B). The raised positioning plates 75 and 76 enter within the disc accommodating portion $32_N$, that is, within the gap between the adjacent partitions 30 which define the disc accommodating portion $32_N$. Moreover, the enlarging lever 78 operates as shown in FIG. 6, and the guide plates 72 and 73 move in directions so as to separate from each other and fully opens the opening 77. As a result, the reproducing apparatus 10 assumes the state shown in FIG. 11B.

As the cam gear 55 undergoes further rotation, the positioning plates 75 and 76 further enter within the disc accommodating portion $32_N$. In this state, the lower ends of the positioning plates 75 and 76 project downwardly from both ends of the disc accommodating portion $32_N$. Accordingly, when returning the disc $21_N$ within the disc accommodating portion $32_N$ as will be described later on in the specification, the positioning plates 75 and 76 in this state act as reference members for restricting the positions of the guide plates 72 and 73 so that the guide plates 72 and 73 coincide with the disc accommodating portion $32_N$. The positioning plate 76 pushes the disc stopper 35 upwardly and rotates the disc stopper 35 clockwise. Hence, the reproducing apparatus 10 assumes the state shown in FIG. 11C. In the state shown in FIG. 11C, the stopping of the disc $21_N$ by the disc stopper 35 is cancelled, and instead, the disc carrying arm 66 (disc catcher 71) supports the disc $21_N$.

When the cam gear 55 undergoes further rotation, the lever 70 then moves in the direction of the arrow Y2, and the disc carrying arm 66 starts to rotate counterclockwise. Responsive to the counterclockwise rotation of the disc carrying arm 66, the disc $21_N$ falls due to its own weight in the state supported by the disc catcher 71. As shown in FIGS. 11D and 12B, the disc $21_N$ escapes from the disc accommodating portion $32_N$, and enters into the flat space 61 inside the reproducer part 23 through the opening 77 which is fully open. As the cam gear 55 undergoes further rotation, the disc carrying arm 66 rotates and returns to the original position. Thus, the disc $21_N$ escapes from the rack 22 and completely enters within the reproducer part 23 as shown in FIG. 11E. After the disc $21_N$ escapes from the rack 22, the disc $21_N$ falls in a state where the outer peripheral edge 21a of the disc $21_N$ is guided by ribs 59a and 59b which are located on both sides of the guide panel 59. Finally, the outer peripheral edge 21a of the disc $21_N$ is supported by a lower rib 59c of the guide panel 59 and by a rib 59d, so that the disc $21_N$ does not roll within the reproducer part 23.

Because the disc $21_N$ falls due to its own weight, the disc catcher 71 need only support the outer peripheral edge 21a of the disc $21_N$ when the disc $21_N$ is transferred from the reproducer part 23. It is thus unnecessary to provide a mechanism for clamping the disc $21_N$ when transferring the disc $21_N$, and the construction of the disc carrying mechanism 47 is simple. In addition, the disc $21_N$ does not simply fall due to its own weight when the stopping by the disc stopper 35 is cancelled, but falls at an appropriate speed under the support of the disc catcher 71. Hence, the disc $21_N$ is satisfactorily protected while being transferred from the rack 22 into the reproducer part 23.

In a final rotating stage of the cam gear 55, the shifting mechanism 46 and the disc clamping mechanism 50 are operated. The disc reproducer 45 moves in the direction of the arrow X1, and the disc clamper 87 moves in the direction of the arrow X2. The disc $21_N$ is guided by the disc clamper 87 and is slightly raised until the center of the disc $21_N$ coincides with the center of the disc reproducer 45 (center of a turntable 99). Hence, the disc $21_N$ is loaded onto the turntable 99 in a state where the outer peripheral edge 21a of the disc $21_N$ is slightly separated from the ribs 59c, 59a, and 59d as shown in FIG. 12C.

Next, the disc reproducer 45 is operated, and the disc $21_N$ is rotated at a high speed within the reproducer part 21. The disc $21_N$ is played, and recorded signals on the disc $21_N$ are reproduced.

When the playing of the disc $21_N$ is completed, the loading motor 58 starts to rotate in the reverse direction. The cam gear 55 rotates in the direction of the arrow B2, up to the original position where the initial reed switch 97 is turned ON.

As the cam gear 55 rotates in the reverse direction, the disc carrying mechanism 47, the positioning mechanism 49, the shifting mechanism 46, and the disc clamping mechanism 50 simply operate in directions opposite to the directions in which they operated during the disc loading mode, as shown in FIGS. 10(A), 10(B), 10(D), and 10(E). In addition, the disc guide mechanism 48 operates so as to guide the disc $21_N$ as shown in FIG. 10(C). The disc separating mechanism 51 operates as shown in FIG. 10(F).

In the initial reverse rotating stage of the cam gear 55, the disc reproducer 45 and the disc clamper 87 move in directions so as to separate from each other. The clamping of the disc $21_N$ with respect to the disc reproducer 45 is cancelled as shown in FIG. 12D. Next, the disc carrying arm 66 rotates clockwise, and the disc catcher 71 catches the outer peripheral edge 21a of the disc $21_N$ and pushes the disc $21_N$ upwardly. As shown in FIG. 11D, the ejection of the disc $21_N$ outside the reproducer part 23 is started.

In the initial stage of the disc ejecting operation, the disc guide mechanism 48 operates as shown in FIG. 10(C). The guide plates 72 and 73 close upon each other and pinch the positioning plates 75 and 76, as shown in FIGS. 6, 8, and 12D. Accordingly, the disc guide mechanism 48 accurately assumes a position immediately below the disc accommodating portion $32_N$, in a state where the sloping guide parts 72a and 73a can guide the disc $21_N$ which is ejected from the reproducer part 23 and the opening 77 is opened to a width slightly larger than the thickness of the disc $21_N$.

In FIG. 5, the rotary arm assembly 89 is kicked and rotated counterclockwise by the projection 55B-3. The disc separator 88 is guided by the longitudinal holes 90a and 90b, and moves slightly in the direction of the arrow X2 while moving in the direction of the arrow Y2 up to the position indicated by a two-dot chain line in FIG. 5. Thereafter, the disc separator 88 immediately returns by the action of the spring 91, as may be seen from FIG. 10(F). As shown in FIG. 12D, the separating part 88a enters between discs $21_{N+1}$ and $21_{N-1}$ which are adjacent to the disc $21_N$, at a position immediately above the opening 77. For this reason, even in a case where the two discs $21_{N+1}$ and $21_{N-1}$ are slightly inclined and the lower edges of the two discs close upon each other and narrow the gap between the two discs, it is possible to reserve a certain gap between the two discs $21_{N+1}$ and $21_{N-1}$ by the separating part 88a so that the disc $21_N$ can enter into the disc accommodating portion $32_N$.

Accordingly, the disc $21_N$ moves in the direction of the arrow Z1 in a state where the outer peripheral edge 21a at the lower end of the disc $21_N$ is simply caught by the disc catcher 71. As shown in FIG. 12D, The outer peripheral edge 21a at the upper end of the disc $21_N$ is guided by the sloping guide parts 72a and 73a and is directed toward the opening 77. The disc $21_N$ escapes outside the reproducer part 23 through the opening 77 which is not widened, while being guided by the opening 77. The disc $21_N$ moves upwardly between the discs $21_{N+1}$ and $21_{N-1}$. In this state, the certain gap is formed between the discs $21_{N+1}$ and $21_{N-1}$ by the action of the separating part 88a. Thus, the disc $21_N$ can smoothly enter between the discs $21_{N+1}$ and $21_{N-1}$ without hitting the discs $21_{N+1}$ and $21_{N-1}$, as shown in FIG. 12E, and the disc $21_N$ begins to enter within the disc accommodating portion $32_N$.

When the disc carrying arm 66 rotates clockwise to the limit, the disc $21_N$ is completely ejected from the reproducer part 23 and is returned within the original disc accommodating portion $32_N$ as shown in FIGS. 11C and 11B. The operation of returning the disc $21_N$ within the original disc accommodating portion $32_N$ is also carried out in a state where the disc catcher 71 simply catches the outer peripheral edge 21a of the disc $21_N$ and pushes the disc $21_N$ upwardly. Thus, the construction of the disc carrying mechanism 47 is simple compared to the case where the disc carrying mechanism is designed to clamp the disc. When the disc $21_N$ is accommodated within the disc accommodating portion $32_N$, the positioning plates 75 and 76 move downwardly, and the disc stopper 35 returns to the operating state. As a result, the reproducing apparatus 10 assumes the state shown in FIG. 11B.

As the cam gear 55 undergoes further rotation, the disc carrying arm 66 then starts to rotate counterclockwise. In the state where the cam gear 55 is rotationally returned to the original position, the reproducing apparatus 10 returns to the initial state shown in FIGS. 11A and 12A. In this initial state of the reproducing apparatus 10, the disc $21_N$ is stopped by the disc stopper 35 and is accommodated within the disc accommodating portion $32_N$.

By repeating the operations described heretofore, the designated disc within the rack 22 is successively and selectively loaded on the turntable 99 and played, and then returned into the original disc accommodating portion within the rack. In other words, it is possible to play a plurality of discs in succession.

Figure 13:
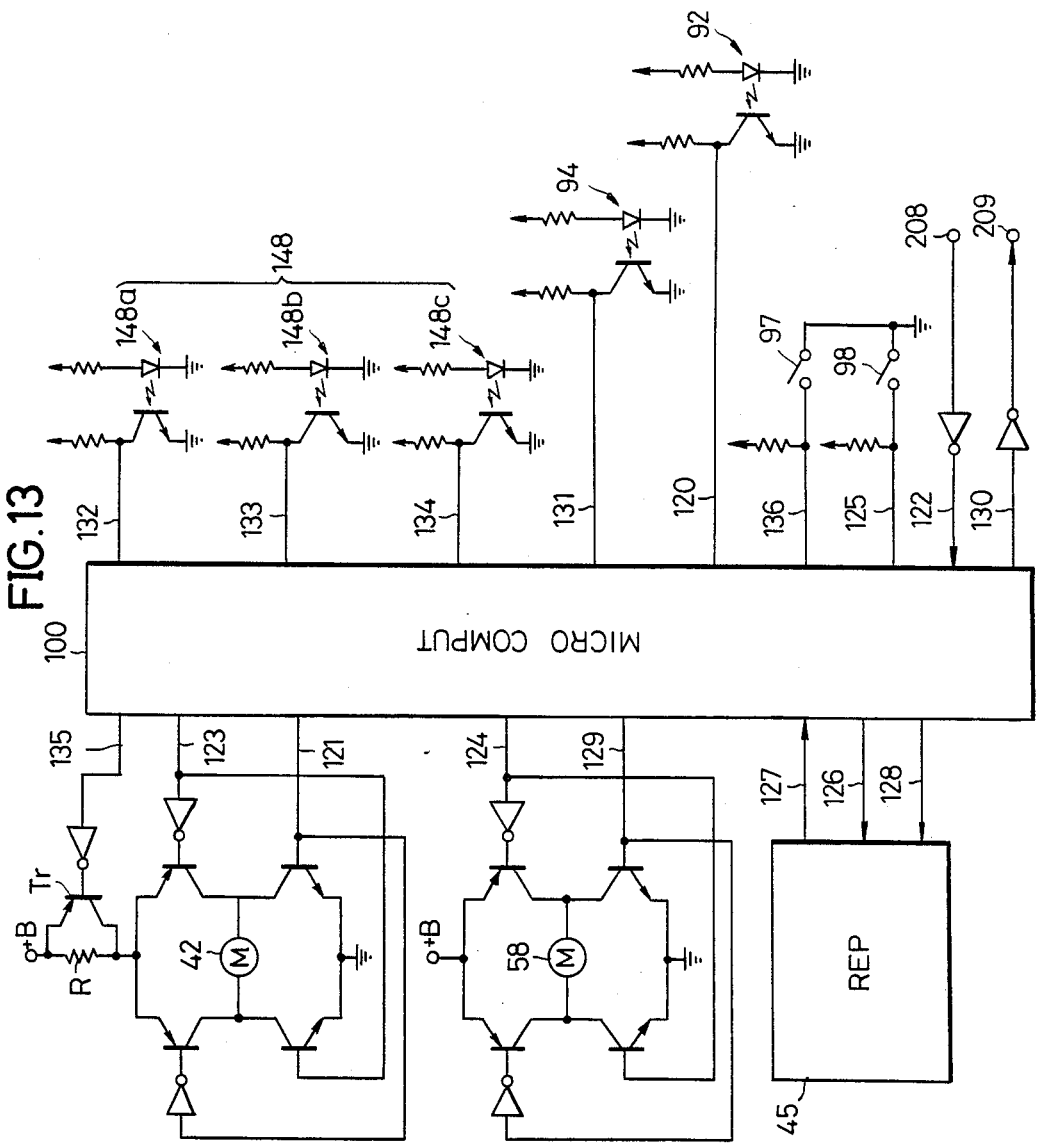
FIG. 13 is a general circuit diagram for explaining the operation of a microcomputer which controls the reproducing apparatus shown in FIG. 2.

A microcomputer 100 is built into the reproducing apparatus 10 as shown in FIG. 13, and the operations of the reproducing apparatus described heretofore are carried out under the control of the microcomputer 100. In FIG. 13, those parts which are the same as those corresponding parts in FIGS. 2 through 8 are designated by the same reference numerals.

The operation of the microcomputer 100 will now be described by referring to FIG. 14.

Figure 14:
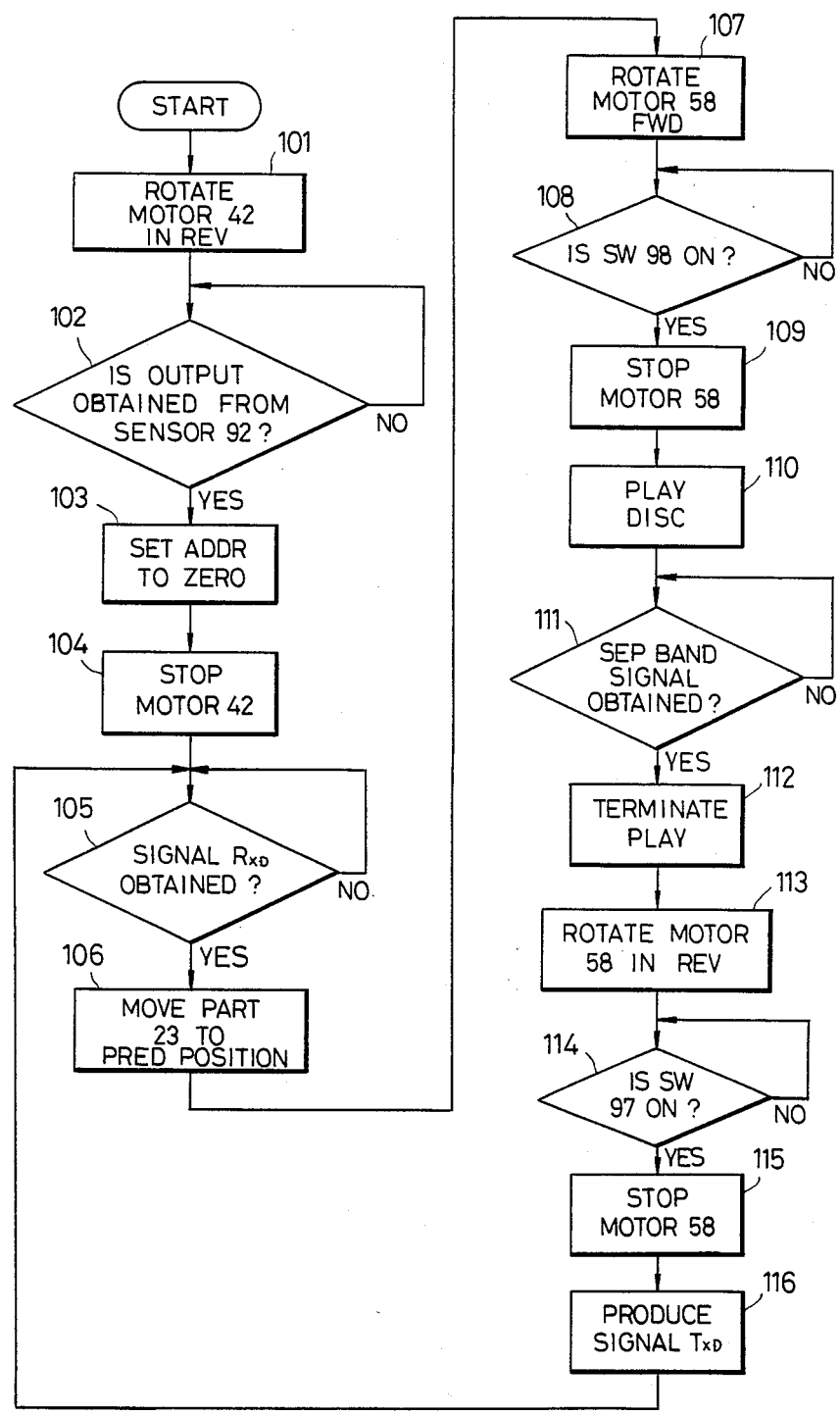
FIG. 14 is a flow chart for explaining the operation of the microcomputer shown in FIG. 13.

When the power source of the reproducing apparatus 10 is turned ON, the microcomputer 100 produces a signal through a line 121 shown in FIG. 13 and rotates the motor 42 in the reverse direction in a step 101 shown in FIG. 14. A subsequent step 102 discriminates the existence of a signal from the initial sensor 92. When the signal from the initial sensor 92 is received by the microcomputer 100 through a line 120, the discrimination result in the step 102 becomes YES, and the address is set to zero in a step 103. A step 104 stops the supply of the signal to the motor 42 through the line 121, so as to stop the motor 42.

A step 105 discriminates the existence of an address designating signal. When an address designating signal $R_{XD}$ is supplied to the microcomputer 100 through an input terminal 208 and a line 122, the discrimination result in the step 105 becomes YES, and a step 106 is performed. In the step 106, the microcomputer 100 produces a signal through a line 123 so as to rotate the motor 42 in the forward direction, and the reproducer part 23 is moved in the direction of the arrow X1 up to a predetermined position opposing the disc accommodating portion $32_N$ at the address N. This step 106 will be described in detail later on in the specification. When the reproducer part 23 reaches and stops at the predetermined position, the microcomputer 100 produces a signal through a line 124 so as to rotate the loading motor 58 in the forward direction and carry out the disc loading operation in a step 107. A step 108 discriminates whether the return reed switch 98 is ON. When the microcomputer 100 receives a signal through a line 125, the discrimination result in the step 107 is YES, and a step 109 is performed so as to cut off the supply of the signal through the line 124 and stop the loading motor 58. Next, the microcomputer 100 produces a reproduction start signal through a line 126 in a step 110, and the reproducer 45 starts to play the disc $21_N$.

When the playing of the disc $21_N$ is started, a step 111 discriminates the existence of a separation band signal. When the designated piece of music is played and the separation band signal is received by the microcomputer 100 through a line 127, the discrimination result in the step 111 becomes YES, a subsequent step 112 is performed. The microcomputer 100 produces a play terminating signal through a line 128 in the step 112, and the reproducer 45 terminates the playing of the disc $21_N$.

Next, the microcomputer 100 produces a signal through a line 129 in a step 113, so as to rotate the loading motor 58 in the reverse direction and carry out the disc unloading operation. A step 114 discriminates whether the initial reed switch 97 is ON. When the microcomputer 100 receives a signal through a line 136, the discrimination result in the step 114 is YES, and a step 115 is performed. The microcomputer 100 cuts off the supply of the signal through the line 129 in the step 115, so as to stop the loading motor 58. The microcomputer 100 produces a play terminating signal $T_{XD}$ through a line 130 and an output terminal 209 in a step 116, and the operation is returned to the step 105 wherein the existence of the address designating signal $R_{XD}$ is discriminated. The step 105 continues to perform the discrimination until the microcomputer 100 receives the address designating signal $R_{XD}$ through the line 122.

Next, the step 106 will be described in more detail. First, description will be given with respect to the mechanisms of the reproducing apparatus 10 which are related to the step 106, by referring to FIGS. 15, 16, and 17A through 17C.

As shown in FIGS. 2 and 3, a mechanism 140 for moving the reproducer part 23, comprises a worm gear assembly 143 which is made up of a worm 141 and a worm wheel 142. The worm 141 is supported vertically by a bearing member 144, and is rotated by the motor 42 through a belt 145. A disc-shaped plate 147 is mounted on top of a shaft 146 which supports the worm 141. The disc-shaped plate 147 has an address pattern which will be described later on in the specification. Three photosensors 148a, 148b, and 148c for detecting the address pattern, are mounted on a bracket 149 so as to oppose the disc-shaped plate 147. The photosensors 148a, 148b, and 148c constitute a second sensor 148. Each of the members constituting the mechanism 140, are mounted on a side plate 150 of the reproducer part 23.

The worm 141, the worm wheel 142, the pinion 43, and the rack 44 are designed so that the reproducer part 23 moves over a distance corresponding to the width of one slit 33, that is, the slit detector 94 constituting a first sensor moves over a distance corresponding to the width of one slit 33, responsive to the rotation of the disc-shaped plate 147 over a little less than one revolution. The worm gear mechanism 143 is designed so that the reproducer part 23 moves in the direction of the arrow X1 when the disc-shaped plate 147 rotates in the direction of an arrow F1 (clockwise) in FIG. 16, and so that the reproducer part 23 moves in the direction of the arrow X2 when the disc-shaped plate 147 rotates in the direction of an arrow F2 (counter-clockwise) in FIG. 16.

Figure 16:
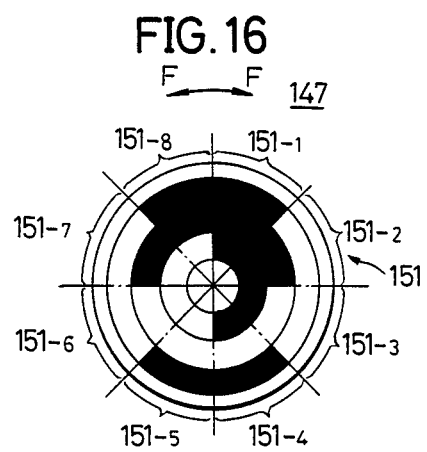
FIG. 16 shows an address pattern on the disc.

An address pattern 151 shown in FIG. 16 is formed on the disc-shaped plate 147. In FIG. 16, the black parts represent non-reflecting parts, and the remaining white parts represent reflecting parts. The address pattern 151 comprises 3-bit code patterns which are arranged in the circumferential direction in eight equally divided sectors of the disc-shaped plate 147. Code patterns 151-1, 151-2, ..., and 151-8 which represent addresses "1" through "8", are arranged in an incrementing direction of the arrow F1. The photosensors 148a through 148c each produce a signal "0" when the non-reflecting part of the address pattern 151 is detected, and produce a signal "1" when the reflecting part of the address pattern 151 is detected. The photosensors 148a through 148c produce code signals responsive to each of the code patterns as shown in the following table. The address, the code pattern, and the address code are shown in correspondence with each other in the table.

TABLE

| Address | Code Pattern | Address Code | | |
|---|---|---|---|---|
| | | Output of 148a | Output of 148b | Output of 148c |
| 1 | 151-1 | 0 | 0 | 0 |
| 2 | 151-2 | 1 | 0 | 0 |
| 3 | 151-3 | 1 | 1 | 0 |
| 4 | 151-4 | 0 | 1 | 0 |
| 5 | 151-5 | 0 | 1 | 1 |
| 6 | 151-6 | 1 | 1 | 1 |
| 7 | 151-7 | 1 | 0 | 1 |
| 8 | 151-8 | 0 | 0 | 1 |

Accordingly, the addresses "1" through "8" can be discriminated from the detection signal produced from the second sensor 148.

Next, description will be given with respect to the control of the motor 42 responsive to the detection signals from the first and second sensors 94 and 148, by referring to FIGS. 15, 17A, 17B, and 17C.

Figure 17A:
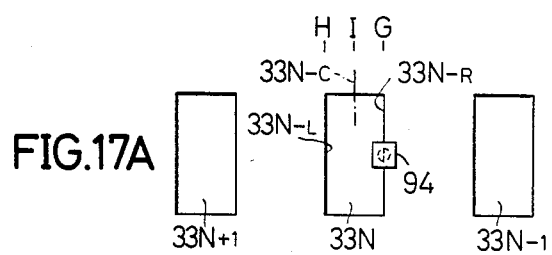
FIGS. 17A through 17C respectively show the manner in which a first sensor is positioned at the center of a desired slit.
Figure 17B:
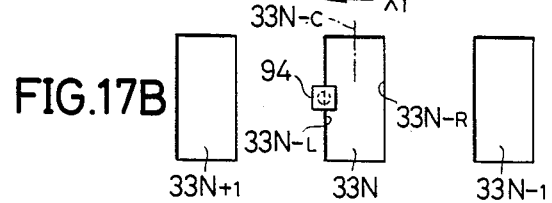
Figure 17C:
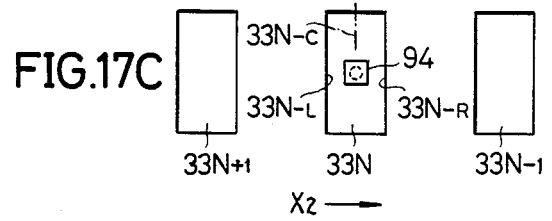

When the address N is designated and the first sensor 94 moves in the direction of the arrow X1 together with the reproducer part 23, the slit detection signal from the first sensor 94 is supplied to an address counter 152 and counted therein. An address data produced from the address counter 152 is compared with a memory data from a target address memory 154, in an address comparing circuit 153. When the first sensor 94 passes a slit $33_{N-1}$ and then detects a slit $33_N$, the address data from the address counter 152 coincides with the memory data from the target address memory 154, and the address comparing circuit 153 produces a coincidence signal. This coincidence signal is supplied to a processing circuit 155. The processing circuit 155 performs an arithmetic operation to obtain a code signal I corresponding to the center of the slit $33_N$ in the directions of the arrows X1 and X2, that is, the width direction thereof. The processing circuit 155 compares this code signal I with a code signal produced from the second sensor 148. The code signal I is obtained from a code signal G which is produced from the second sensor 148 when the first sensor 94 detects a right edge $33_{N-R}$ of the slit $33_N$, and from a code signal H which is produced from the second sensor 148 when the first sensor 94 traverses the slit $33_N$ and detects a left edge $33_{N-L}$ of the slit $33_N$ as shown in FIG. 17B. The processing circuit 155 produces a signal for rotating the motor 42 in the forward direction, a signal for rotating the motor 42 in the reverse direction, and a signal for stopping the motor 42, responsive to the difference between the code signal which is produced from the second sensor 148 and the code signal I. The signal produced from the processing circuit 155 is supplied to a motor control circuit 156 which controls the rotation of the motor 42 so that the difference between the code signal which is produced from the second sensor 148 and the code signal I decreases. When the code signal which is produced from the second sensor 148 coincides with the code signal I and the target address is reached, the motor 42 is stopped. Hence, as shown in FIG. 17C, the reproducer part 23 stops at a position where the first sensor 94 accurately opposes a center position $33_{N-C}$ of the slit $33_N$ at the target address.

Figure 15:
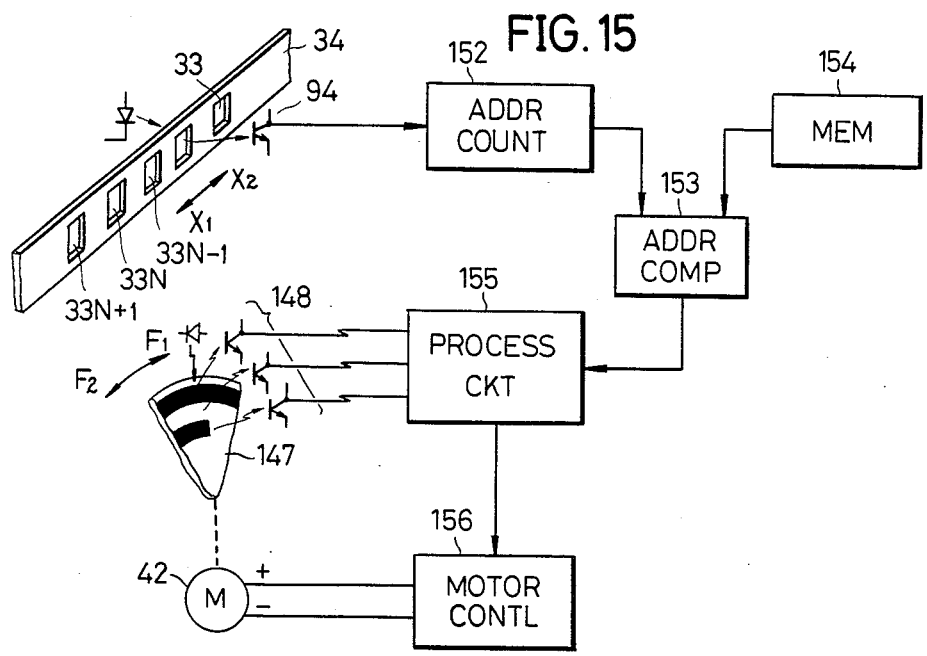
FIG. 15 shows the construction of a means for stopping a reproducer part at a predetermined position.

The address counter 152, the address comparing circuit 153, the target address memory 154, and the processing circuit 155 shown in FIG. 15, are constituted by the microcomputer 100 as shown in FIG. 13.

Description will now be given with respect to the step 106 of the microcomputer 100 in further detail, by referring to FIG. 18.

When the motor 42 is started in a step 160, a step 161 discriminates whether the output level of the first sensor 94 has changed from a low level to a high level. The output of the first sensor 94 assumes a high level when the first sensor 94 opposes the slit 33, and assumes a low level when the first sensor 94 does not oppose the slit 33. When the first sensor 94 opposes the slit 33 and the level of the signal in a line 131 shown in FIG. 13 becomes high, the discrimination result in the step 161 becomes YES, and a subsequent step 162 is performed. The step 162 discriminates whether the reproducer part 23 moves in the direction of the arrow X1. When the reproducer part 23 moves in the direction of the arrow X1, the discrimination result in the step 162 is YES, and a step 163 is performed. In the step 163, an address which is indicative of the position of the reproducer part 23 is incremented every time the first sensor 94 passes one slit 33. On the other hand, when the discrimination result in the step 162 is NO, a step 164 is performed. In the step 164, the address which is indicative of the position of the reproducer part 23 is decremented every time the first sensor 94 passes one slit 33. A step 165 is performed subsequent to the step 163 or 164, to determine whether the address has become equal to the target address. When the discrimination result in the step 165 is NO, the operation is returned to the step 161 so as to repeat the above operation until the discrimination result in the step 165 becomes YES.

When the first sensor detects the slit $33_N$ and the address becomes equal to the target address, the discrimination result in the step 165 becomes YES, and a subsequent step 166 is performed. In the step 166, the microcomputer 100 stores the code signal G which is obtained from the second sensor 148 through lines 132, 133, and 134 when the first sensor 94 detects the right edge $33_{N-R}$ of the slit $33_N$ as shown in FIG. 17A. A step 167 discriminates whether the output level of the first sensor 94 has changed from a high level to a low level. When the first sensor 94 traverses the slit $33_N$, the discrimination result in the step 167 becomes YES, and the microcomputer 100 stores the code signal H from the second sensor 148 in a step 168. Then, a step 169 performs an arithmetic operation to obtain the code signal I from the code signals G and H.

Next, a step 170 sets a time T to zero. The microcomputer 100 produces a signal through a line 135 in a step 171. Accordingly, a transistor Tr shown in FIG. 13 is turned OFF, and the voltage supplied to the motor 42 decreases due to a resistor R inserted between a power source voltage +B and the motor 42. The microcomputer 100 produces a signal through the line 121 in a step 172, so that the motor 42 is rotated in the reverse direction by a low voltage. When the motor 42 rotates in the reverse direction, the moving direction of the reproducer part 23 is reversed. In other words, the reproducer part 23 moves in the direction of the arrow X2 at a low speed, and the first sensor 94 then moves to oppose the central part of the slit $33_N$. The code signal produced from the second sensor 148 is decremented.

A step 173 discriminates whether the code signal produced from the second sensor 148 is equal to the code signal I. When the first sensor 94 reaches the center position $33_{N-C}$ of the slit $33_N$ as shown in FIG. 17C, the discrimination result in the step 173 becomes YES, and a subsequent step 174 is performed. The microcomputer 100 stops the supply of the signal through the line 121 in the step 174, so as to stop the motor 42. Further, the time T is incremented in a step 175, and a step 176 discriminates whether the time T has reached a predetermined value (for example, a value M). When the discrimination result in the step 176 is NO, a step 177 delays the operation of the microcomputer 100, and the operation is returned to the step 173. The checking loop constituted by the steps 173 through 177 are performed until the time T becomes equal to the predetermined value M, since the first sensor 94 may not remain at the center position $33_{N-C}$. This checking loop is repeatedly performed when the first sensor 94 remains at the center position $33_{N-C}$. When the checking loop is repeatedly performed M times, the discrimination result in the step 176 becomes YES, and the operation is returned to the step 107 shown in FIG. 14. In other words, the checking loop constituted by the steps 173 through 177 is performed so as to check that the reproducer part 23 is positively stopped at the position which precisely corresponds to the designated disc accommodating portion $32_N$.

Therefore, the reproducer part 23 is positioned with a high precision. Thus, as described before, the disc within the designated disc accommodating portion can be loaded onto the turntable and played without error, even when the gap between the adjacent disc accommodating portions is considerably small. Further, the disc which is played, can be returned within the original disc accommodating portion without error.

In a case where the code signal which is produced from the second sensor 148 is not equal to the code signal I, the discrimination result in the step 173 is NO, and the operation advances to a step 178. The step 178 discriminates whether the code signal produced from the second sensor 148 is greater than the code signal I. The discrimination result in the step 178 is YES when the first sensor 94 is located at a position just prior to returning to the center position $33_{N-C}$, and a subsequent step 179 is performed. The microcomputer 100 produces a signal through the line 121 in the step 179 so as to rotate the motor 42 in the reverse direction. A step 180 sets the time T to zero. Further, the step 177 delays the operation of the microcomputer 100. The delay time in the step 177 is selected so that the reproducer part 23 may move in the direction of the arrow X2 to a certain extent. When the code signal produced from the second sensor 148 becomes equal to the code signal I, the discrimination result in the step 173 becomes YES, and the checking loop constituted by the steps 173 through 177 is repeated as described before until the time T becomes equal to the predetermined value M.

When the first sensor 94 passes by the center position $33_{N-C}$, the discrimination result in the step 178 becomes NO. In this case, a step 181 discriminates whether the code signal produced from the second sensor 148 is smaller than the code signal I. A step 182 is performed when the discrimination result in the step 181 is YES. The microcomputer 100 produces a signal through the line 123 in the step 182, so as to rotate the motor 42 in the forward direction and move the reproducer part 23 in the direction of the arrow X1. When the code signal produced from the second sensor 148 becomes equal to the code signal I, the checking loop constituted by the steps 173 through 177 is repeated until the time T becomes equal to the predetermined value M as described before.

The reproducer part 23 may undergo a slight movement when an external shock is applied to the reproducer part 23 while the microcomputer 100 is performing the checking loop constituted by the steps 173 through 177. In this case, operations including the steps 178 and 179 or the steps 181 and 182 are performed depending on the direction in which the reproducer part 23 undergoes the slight movement. Even in such a case, the step 180 is performed, so that the checking operation is performed for the same repetition number M.

Next, description will be given with respect to the disc stopper 35 and the mechanisms related thereto, by referring to FIGS. 4 and 19.

Figure 19:
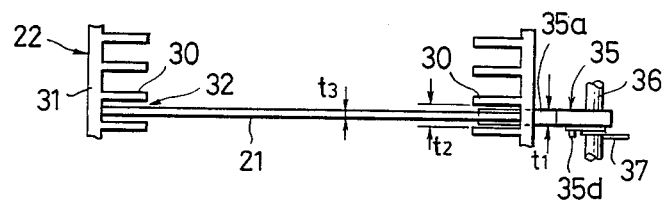
FIG. 19 is a plan view showing the relationship between a disc stopper and a rack.

In FIGS. 4 and 19, the disc stopper 35 comprises an upper contact part 35a, an intermediate disc stopping part 35b, a lower contact part 35c, and a spring stopping projection 35d. The disc stopper 35 is supported by the pin 36, and is rotatable within a plane which is an extension of the disc accommodating portion 32. The disc stopper 35 has a thickness t1, and the disc accommodating portion 32 has a thickness t2. The spring 37 which is fitted over the pin 36, urges the disc stopper 35 to rotate counterclockwise in FIG. 4. Thus, the disc stopper 35 stops at a rotational position where the upper contact part 35a makes contact with the right side plate 31. In this state, the disc stopping part 35b projects within the disc accommodating portion 32. The disc 21 is accommodated within the disc accommodating portion 32 in this state, and the lower portion of the outer peripheral edge 21a of the disc 21 hits the disc stopping part 35b at the position A3 so that the disc 21 will not fall. The disc 21 has a thickness t3 which is in the range of 1.2 mm, for example.

The thicknesses of the disc stopper 35, the disc accommodating portion 32, the disc 21, and the positioning plate 76 are selected so that relations $(t2-t3)<t1<t2$ and $(t2-t1)<t4<t2$ stand, where t4 represents the thickness of the positioning plate 76. Accordingly, the space in which the disc stopper 35 rotates, is limited within the plane which is an extension of the disc accommodating portion 32. This means that the provision of the disc stopper 35 will not increase the width of the disc accommodating portion 32 in the axial direction of the disc 21. Hence, the disc accommodating portions 32 can be arranged with a small pitch, and the length of the rack 22 may be small.

In FIG. 4, the weight of the disc 21 itself, is supported by the disc stopping part 35b of the disc stopper 35. In this state, a force acts on the disc stopper 35 in the direction of an arrow J. However, the center of rotation of the disc stopper 35, that is, the pin 36, is located above an imaginary line which is in this direction of the arrow J. As a result, a counterclockwise moment acts on the disc stopper 35, and the disc stopper 35 is positively maintained in the position where the upper contact part 35a makes contact with the side plate 31, in cooperation with the action of the spring 37. In this connection, a spring having a relatively small spring force is used for the spring 37.

As indicated by the two-dot chain line in FIG. 4, the disc stopper 35 is slightly raised by the disc carrying arm 66, and is rotated clockwise in a state where the disc stopping part 35b is slightly separated from the disc 21. For this reason, the disc stopping part 35b will not hit the outer peripheral edge 21a of the disc 21 when the disc stopper 35 rotates, and the disc 21 and the disc stopping part 35b are prevented from premature wear. When the disc stopper 35 rotates clockwise in FIG. 4, the weight of the disc 21 does not act of the disc stopper 35, and the disc stopper 35 can smoothly rotate from the disc stopping position against the small force exerted by the spring 37.

Next, description will be given with respect to a disc removing mechanism 190 which is used when changing the disc 21 which is accommodated within the disc accommodating portion 21, by referring to FIGS. 2, 4, 5, and 20 through 24.

As shown in FIG. 2, the disc removing mechanism 190 is supported by a shaft 191 which provided horizontally along the rack 22. Further, as shown in an enlarged scale in FIGS. 20 and 21, cylindrical supports 193 are provided on both sides of a casing 192 of the disc removing mechanism 190. The cylindrical supports 193 respectively project from the casing 192 in the moving directions of the disc removing mechanism 190. The shaft 191 is inserted through the cylindrical supports 193, and the disc removing mechanism 190 is stably movable in the directions of the arrows X1 and X2 in a state where the cylindrical supports 193 slide along the shaft 191. As shown in FIG. 22, a manipulation lever 194, a gear member 195 supported coaxially with the manipulation lever 194, a hook 196 for locking the gear member 195, and a rotary lever 197 are provided within the casing 192. The manipulation lever 194 is manipulated when lifting the disc 21 from the disc accommodating portion 32. The hook 197 meshes with the gear member 195 so as to lift the disc 21. FIG. 22 shows the disc removing mechanism 190 in a state before the manipulation lever 194 is manipulated.

A manipulation part 194a of the manipulation lever 194 projects upwardly from the casing 192 through an upper opening 192a. An U-shaped depression 194b and a trapezoidal projection 194c are located at the lower part of the manipulation lever 194. The manipulation lever 194 is supported by a shaft 192b which projects from the side surface of the casing 192. In addition, a torsion spring 198 is provided coaxially with the manipulation lever 194, and this torsion spring 198 urges the manipulation lever 194 to rotate counterclockwise. Hence, the manipulation lever 194 is rotated in the direction of an arrow K1, and makes contact with an edge of the upper opening 192a.

The gear member 195 is supported by the shaft 192b in a state where the gear member 195 is fitted within the depression 194b of the manipulation lever 194. An arcuate gear portion 195a, and a substantially triangular engaging portion 195b for engaging with the hook 196, are provided at the lower part of the gear member 195. A support portion 195c of the gear member 195, which is supported by the shaft 192b, has an U-shaped contour. A triangular gap 199 is formed between the support portion 195c and the depression 194b. As will be described later on in the specification, the triangular gap 199 is provided so that there is sufficient play for the gear member 195 to rotate within the depression 194b.

A cutout 196a and a sloping contact surface 196b are located at the tip end of the hook 196. The cutout 196a engages with a corner portion 195b-1 of the engaging portion 195b of the gear member 195. When the manipulation lever 194 is manipulated in the direction of an arrow K2, the contact surface 196b makes contact with a sloping surface 194c-1 of the projection 194c. The hook 196 is supported by a shaft 192c which projects from the casing 192. A torsion spring 200 is provided coaxially with the hook 196, and this torsion spring 200 urges the hook 196 to rotate counterclockwise. Thus, before the manipulation lever 194 is manipulated, the hook 196 makes contact with an arcuate bottom surface 195b-2 of the engaging portion 195b of the gear member 195. The spring force of the torsion spring 198 is greater than the spring force of the torsion spring 200. As will be described later on in the specification, the torsion spring 198 acts on the hook 196 so as to rotate the hook 196 against the action of the torsion spring 200.

The rotary lever 197 comprises a gear portion 197a, and a lever portion 197b which projects downwardly from the side surface of the gear portion 197a. The rotary lever 197 is supported by a shaft 192d which projects from the casing 192. In addition, the rotary lever 197 is rotated in the direction of an arrow L1 in FIG. 24, and opposes a lower opening 192e in the casing 192. The rotary lever 197 projects through the lower opening 192e as the rotary lever 197 rotates in the direction of an arrow L2, and lifts the disc 21 up to a position where the disc 21 is removable from the disc accommodating portion 32. The thickness of the lever portion 197b is slightly smaller than the spacing between two adjacent partitions 30 which define the disc accommodating portion 32, so that the lever portion 197b can easily enter within the disc accommodating portion 32.

Figure 23:
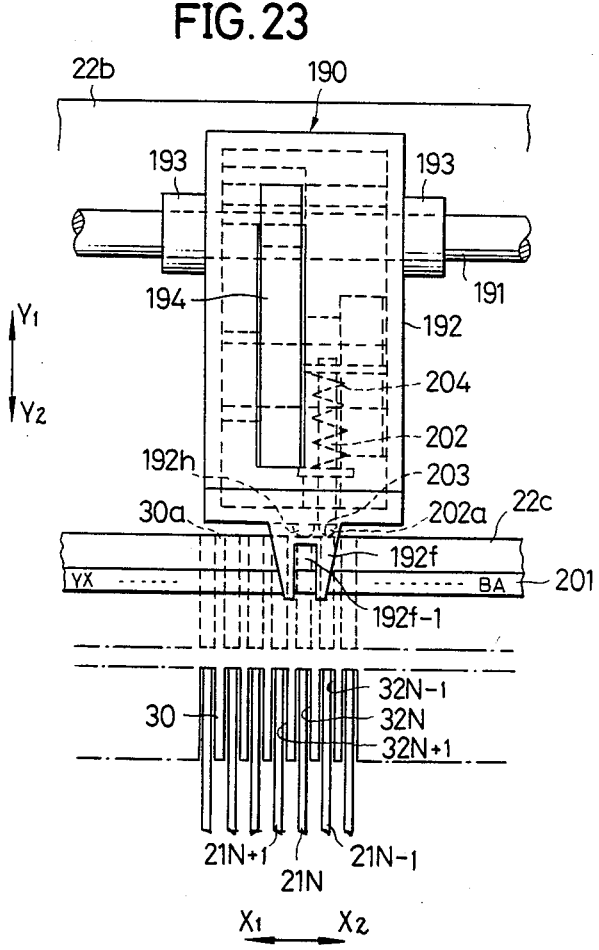
FIG. 23 is a plan view showing the disc removing mechanism.
Figure 20:
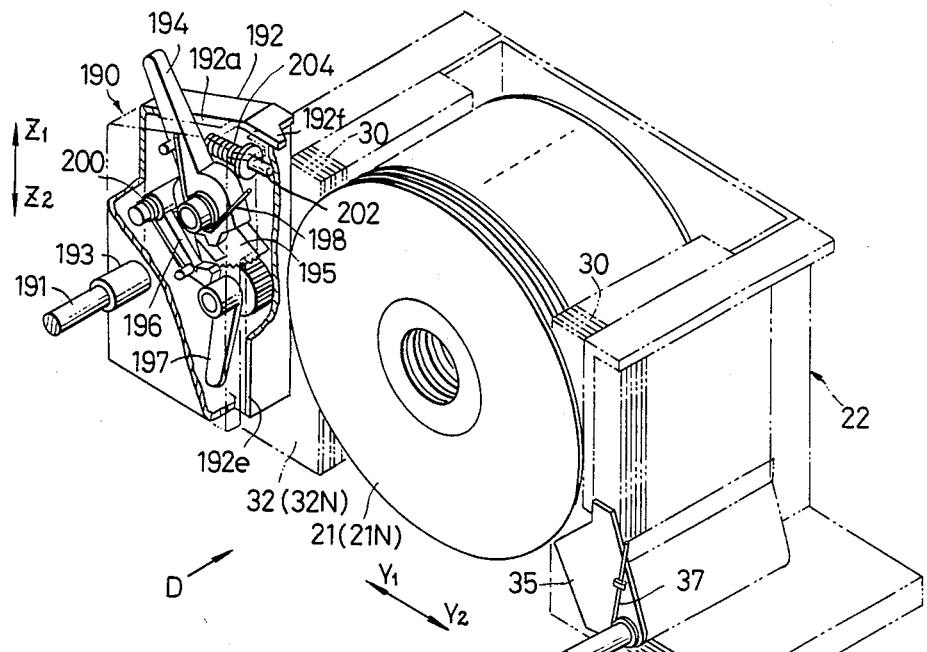
FIGS. 20 and 21 are perspective views, with a part cut away, showing a disc removing mechanism in a state before it is operated and in a state when it is operated.

As shown in FIG. 23, a substantially U-shaped position detector 192f is located on the upper part of the casing 192, and this position detector 192f projects above an upper surface 22a of the rack 22. Addresses A, B, ..., X, and Y are indicated on the upper surface 22a of the rack 22 as address indications 201, at positions corresponding to each of the disc accommodating portions 32, with the same pitch as the disc accommodating portions 32. The address indications 201 oppose the position detector 192f. The address indication 201 which is visible through a window 192f-1 of the position detector 192f, indicates the address of the disc accommodating portion 32 containing the disc 21 which can be removed from the disc accommodating portion 32 by the disc removing mechanism 190.

A tip end portion 202a of a positioning pin 202 has a hemisphere shape, and the positioning pin 202 is movable in the directions of the arrows Y1 and Y2. The positioning pin 202 is urged in the direction of the arrow Y2 by a coil spring 204. The tip end portion 202a of the positioning pin 202 engages with a groove 203 which is formed between rear portions 30a of two adjacent partitions 30 which define the disc accommodating portion 32, so as to position the disc removing mechanism 190 with a click.

A projection 192g having a hemisphere shape, projects from the bottom surface of the casing 192. When the tip end portion 202a of the positioning pin 202 engages with the groove 203 and pushes against the rack 22 by the action of the spring 204, the projection 192g pushes against a flat surface 22b of the rack 22 so as to restrict the play and restrict the counterclockwise rotation of the casing 192. In addition, a projection 192h having a hemisphere shape, projects sidewardly from the casing 192, below the position detector 192f. This projection 192h opposes an edge part 22c which extends in the directions of the arrows X1 and X2 of the rack 22, and act as a stopper for restricting the clockwise rotation of the casing 192.

When moving the disc removing mechanism 190 along the shaft 191, the tip end portion 202a of the positioning pin 202 once moves in the direction of the arrow Y1 against the action of the spring 204 so as to ride over the rear portion 30a of the partition 30, and then moves in the direction of the arrow Y1 and engages with the adjacent groove 203 with a click. In other words, the positioning pin 202 repeats a reciprocating movement in the directions of the arrows Y1 and Y2, as the disc removing mechanism 190 is moved. The disc removing mechanism 190 stably moves in the directions of the arrows X1 and X2 in a state where the projection 192g slides over the flat surface 22b of the rack 22, and is positioned with a click at a position corresponding to the desired disc accommodating portion 32 when the tip end portion 202a of the positioning pin 202 engages with the groove 203.

Next, description will be given with respect to the manipulation of the manipulation lever 194 of the disc removing mechanism 190. For example, it will be assumed that the disc $21_N$ accommodated within the disc accommodating portion $32_N$, among the plurality of discs 21 accommodated within the disc accommodating portions 32, is to be changed with a different disc. In this case, the disc removing mechanism 190 is first moved to the position corresponding to the disc accommodating portion $32_N$. As shown in FIG. 23, the casing 192 is manually moved in the direction of the arrow X1 (or X2) along the shaft 191, up to a position where the letter "N" of the address indications 201 is visible through the center of the window 192f-1 of the position detector 192f. The casing 192 is stopped with a click at a position where the tip end portion 202a of the positioning pin 202 engages with the groove 203. Accordingly, the lower opening 192e of the casing 192 opposes the disc accommodating portion $32_N$ which accommodates the desired disc $21_N$, and the disc removing mechanism 190 assumes a position where the disc $21_N$ can be removed from the disc accommodating portion $32_N$.

In this state, as shown in FIG. 24, the manipulation part 194a of the manipulation lever 194 is pushed so as to rotate the manipulation lever 194 in the direction of the arrow K2 against the action of the spring 198. After the depression 194b rotates over an angle corresponding to the gap 199, the depression 194b makes contact with the side surface of the support portion 195c, and the gear member 195 unitarily rotates clockwise together with the manipulation lever 194. Accordingly, the rotary lever 197 which meshes with the gear member 195, becomes linked with the rotation of the manipulation lever 194 and rotates in the direction of the arrow L2. The rotary lever 197 projects through the lower opening 192e while undergoing the rotation in the direction of the arrow L2, and enters within the desired disc accommodating portion $32_N$. As indicated by a two-dot chain line in FIG. 24, the lever portion 197b obliquely makes contact with the outer peripheral edge 21a of the disc $21_N$ which assumes the accommodated position and is supported within the disc accommodating portion $32_N$ by the disc stopper 35.

As the rotary lever 197 rotates in the direction of the arrow L2, the disc $21_N$ is lifted in the direction of the arrow Z1 from the accommodated position towards the removable position. Since the disc $21_N$ is moved in a direction opposite to the moving direction of the disc $21_N$ when the disc $21_N$ is supplied to the reproducer part 23, the disc stopper 35 need not be rotated from the disc supporting position.

Due to the clockwise rotation of the gear member 195, the hook 196 slides against the bottom surface 195b-2 of the engaging portion 195b. Then, the hook 196 rotates counterclockwise while the contact surface 196b slides against the corner portion 195b-1 of the engaging portion 195b due to the action of the spring 200. Thus, the corner portion 195b-1 of the engaging portion 195b fits into the cutout 196a with a click, and the hook 196 rotated counterclockwise is locked at the raised position. A sloping surface 194c-1 of the projection 194c of the manipulation lever 194 makes contact with the contact surface 196b of the hook 196, and the manipulation lever 194 is stopped at the rotationally manipulated position where the manipulation lever 194 is restricted from returning rotationally in the direction of the arrow K1. In other words, the manipulation lever 194 of the disc removing mechanism 190 is locked in a state where the disc $21_N$ is lifted from the disc accommodating portion $32_N$ up to the removable position. In this state where the manipulation lever 194 is manipulated, a gap 199a is formed between the depression 194b of the manipulation lever 194 and the gear member 195 on the opposite side of the gap 199 which existed before the manipulation lever 194 was manipulated.

Figure 21:
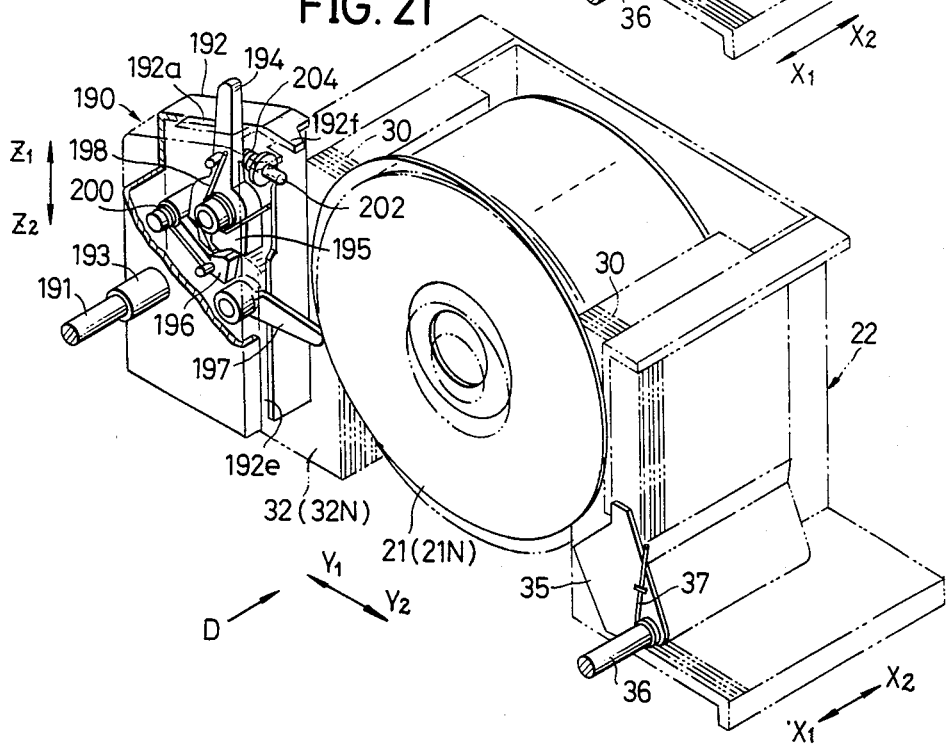

As shown in FIGS. 21 and 24, the disc $21_N$ is lifted from the disc accommodating portion $32_N$ by the rotary lever 197, and projects upwardly compared to the other discs 21 which are accommodated in the rack 22. Accordingly, it is easy to remove the disc $21_N$ from the disc accommodating portion $32_N$.

In the state where the manipulation lever 194 of the disc removing mechanism 190 is manipulated, three forces S1, S2, and S3 act within the disc removing mechanism 190. The sloping surface 194c-1 of the manipulation lever 194 pushes against the contact surface 196b of the hook 196 with the force S1, due to the action of the spring 198 which acts so as to return the manipulation lever 194 to the original position. The cutout 196a pushes the corner portion 195b-1 of the engaging portion 195 upwardly with the force S2, due to the action of the spring 200 which urges the hook 196 to rotate counterclockwise. The corner portion 195b-1 of the engaging portion 195b pushes against the cutout 196a of the hook 196 with the force S3, due to the weight of the disc $21_N$ which acts on the rotary lever 197 so as to rotate the rotary lever 197 in the direction of the arrow L1 and rotate the gear member 195 counterclockwise. As shown in FIG. 24, when the weight of the disc $21_N$ acts on the rotary lever 197, the force S1 acts on the hook 196 from the manipulation lever 194 so as to return the hook 196. However, the force S2 acts on the engaging portion 195b of the gear member 195 from the hook 196 from below the engaging portion 195b, and the force S3 acts on the hook 196 due to the weight of the disc $21_N$ so that the engaging portion 195 engages with the hook 196. The manipulation lever 194 of the disc removing mechanism 190 is maintained in the manipulated state where the disc $21_N$ is at the lifted position, that is, the removable position, due to the interaction of the forces S1, S2, and S3.

When the operator holds and removes the disc $21_N$ from the disc accommodating portion $32_N$, the disc accommodating portion $32_N$ becomes empty and the weight of the disc $21_N$ no longer acts on the rotary lever 197. For this reason, the force S3 for engaging the engaging portion 195b with the hook 196 no longer acts. Because the spring force of the spring 198 is greater than the spring force of the spring 200, the manipulation lever 194 is rotated in the direction of the arrow K1 by the force S1 while pushing the hook 196, and is automatically returned to the original position. As the manipulation lever 194 is rotationally returned to the original position, the hook 196 rotates clockwise against the action of the spring 200, and rotates the gear member 195 to which the force S2 no longer acts. The gear member 195 is rotated clockwise by the hook 196 over an angle corresponding to the gap 199a, and the corner portion 195b-1 of the engaging portion 195b disengages from the cutout 196a of the hook 196 so that the locking with respect to the engaging portion 195b is cancelled. Further, the hook 196 is pushed by the projection 194c of the manipulation lever 194, and is rotated clockwise to a position below the engaging portion 195b, so that the gear member 195 and the manipulation lever 194 can rotationally return to the respective original positions. The rotary lever 197 rotates in the direction of the arrow L1 as the gear member 195 rotationally returns to the original position, and escapes from the disc accommodating portion $32_N$ and passes through the lower opening 192e so as to assume the original position within the casing 192.

Accordingly, when the disc $21_N$ in the removable position is removed from the disc accommodating portion $32_N$, the manipulation lever 194 of the disc removing mechanism 190 is automatically returned to the original state shown in FIG. 22 before the manipulation lever 194 was manipulated. When the disc $21_N$ is removed from the disc accommodating portion $32_N$, the disc removing mechanism 190 becomes movable in the direction of the arrows X1 and X2. Hence, it is possible to prevent the disc removing mechanism 190 from being erroneously moved to a position corresponding to a different disc accommodating portion in a state where the rotary lever 197 remains within the disc accommodating portion $32_N$. After the disc $21_N$ is removed from the disc accommodating portion $32_N$, a different disc is inserted into the disc accommodating portion $32_N$. This different disc is supported in the accommodated position by the disc stopper 35, and the operation of changing the disc $21_N$ to the different disc is completed.

The manipulation lever 194 of the disc removing mechanism 190 is designed to be locked in the manipulated position by use of the weight of the disc 21 which is lifted from the disc accommodating portion 32. For this reason, even when the manipulation lever 194 of the disc removing mechanism 190 is manipulated erroneously when the disc removing mechanism 190 is located at the position corresponding to a disc accommodating portion which does not contain a disc, the manipulation lever 194 will be automatically returned to the original state before the manipulation lever 194 was manipulated.

Further, the present invention is not limited to these embodiments, but various variations and modifications can be made without departing from the scope of the present invention.

We claim:

1. An automatic disc selection type reproducing apparatus comprising:

a disc accommodating mechanism comprising a plurality of disc accommodating portions each having an address and a space for accommodating a single disc amoung a plurality of discs and a plurality of slits each corresponding to said disc being arranged substantially horizontally, said discs being accommodated within said disc accommodating portions in a vertical state where a disc surface of one disc opposes a disc surface of an adjacent disc;

a reproducer part movable along said disc accommodating mechanism at a position substantially below said disc accommodating mechanism, said reproducer part comprising a disc reproducer for playing a disc which is supplied from said disc accommodating mechanism, and a disc carrying mechanism for carrying the disc between said disc accommodating mechanism and said disc reproducer;

designating means for designating a predetermined disc accommodating portion from among said plurality of disc accommodating portions by designating the address of said predetermined disc accommodating portion; and a movement control mechanism for moving said reproducer part along said disc accommodating mechanism and for stopping said reproducer part at a position corresponding to said predetermined disc accommodating portion, said disc carrying mechanism moving within a space below said predetermined disc accommodating portion without entering within said predetermined disc accommodating portion, so as to substantially carry in vertical state a predetermined disc which is accommodated within said predetermined disc accommodating portion, upwardly and downwardly while supporting a lower portion of an outer peripheral edge of said predetermined disc, said disc carrying mechanism supplying said predetermined disc from said predetermined disc accommodating portion to said disc reproducer by utilizing the weight of said predetermined disc when playing said predetermined disc, and returning said predetermined disc into said predetermined disc accommodating portion by separating said predetermined disc from said disc reproducer when the playing of said predetermined disc is completed, said movement control mechanism comprising a motor for driving and moving said reproducer part, a first sensor which moves together with said reproducer part while detecting said slits, a rotary body which has a code pattern formed thereon and rotates in relation to the movement of said reproducer part at a rate such that said code pattern changes a plurality of times with respect to a moving quantity of said first sensor when said first sensor traverses one of said slits, a second sensor for detecting said code pattern on said rotary body, first detecting means for detecting a desired slit responsive to an output detection signal of said first sensor, and second detecting means for obtaining a predetermined value which will be produced from said second sensor when said second sensor detects a center position of said desired slit in the width direction of said desired slit, and for detecting said desired slit when an output detection signal of said second sensor coincides with said predetermined value, and said predetermined value is obtained by performing an arithmetic operation using output detection signals of said second sensor which are produced when said second sensor detects edges of said desired slit in the width direction of said desired slit.

2. An automatic disc selection type reproducing apparatus comprising:

a disc accommodating mechanism comprising a plurality of disc accommodating portions each having an address and a space for accommodating a single disc among a plurality of discs, said disc accommodating mechanism being arragned substantially horizontally, said discs being accommodated within said disc accommodating portions in a vertical state where a disc surface of one disc opposes a disc surface of an adjacent disc;

a reproducer part movable along said disc accommodating mechanism at a position substantially below said disc accommodating mechanism, said reproducer part comprising a disc reproducer for playing a disc which is supplied from said disc accommodating mechanism, and a disc carrying mechanism for carrying the disc between said disc accommodating mechanism and said disc reproducer;

designating means for designating a predetermined disc accommodating portion from among said plurality of disc accommodating portions by designating the address of said predetermined disc accommodating portion;

a movement control mechanism for moving said reproducer part along said disc accommodating mechanism and for stopping said reproducer part at a position corresponding to said predetermined disc accommodating portion; and a disc removing mechanism for lifting a desired disc which is accommodated within a certain disc accommodating portion from among said plurality of discs accommodated within said disc accommodating portions;

said disc carrying mechanism moving within a space below said predetermined disc accommodating portion without entering within said predetermined disc accommodating portion, so as to substantially carry in vertical state a predetermined disc which is accommodated within said predetermined disc accommodating portion, upwardly and downwardly while supporting a lower portion of an outer peripheral edge of said predetermined disc, said disc carrying mechanism supplying said predetermined disc from said predetermined disc accommodating portion to said disc reproducer by utilizing the weight of said predetermined disc when playing said predetermined disc, and returning said predetermined disc into said predetermined disc accommodating portion by separating said predetermined disc from said disc reproducer when the playing of said predetermined disc is completed, said disc removing mechanism comprising a manipulation member which is manually manipulated when lifting said certain disc to a lifted position, a disc lifting member rotated responsive to the manipulation of said manipulation member, for engaging the outer peripheral edge of said certain disc and for lifting said certain disc so that said certain disc is easily removable from outside said disc accommodating mechanism, and a mechanism for locking said manipulation member and said disc lifting member in respective operated positions against the weight of said certain disc which acts on said mechanism through said disc lifting member when said manipulation member is manipulated to the operating position, and for cancelling the locking with respect to said manipulation member and for returning said manipulation member and said disc lifting member back to respective original positions when said certain disc in the lifted position is removed and the weight of said certain disc no longer acts on said disc lifting member.

3. An automatic disc selection type reproducing apparatus comprising:

a disc accommodating mechanism arranged substantially horizontally for accommodating a plurality of discs in a vertical state where a disc surface of one disc is parallel to and opposes a disc surface of an adjacent disc, said disc accommodating mechanism comprising a pair of side plates for preventing each of said discs from moving in a first horizontal direction in a plane which is parallel to the disc surface of each of said discs accommodated in said disc accommodating mechanism, a plurality of partitions defining a plurality of disc accommodating portions each of which has an address and a space extending substantially in said first horizontal direction for accommodating a disc so that said partitions prevent said discs from moving in a second horizontal direction which is perpendicular to the disc surface of each of said discs accommodated in said disc accommodating mechanism, said disc accommodating mechanism having an opening at the bottom thereof for allowing each of the discs to move upwardly and downwardly through said opening, and a plurality of disc stoppers each provided at a corresponding one of said disc accommodating portions for engaging an outer peripheral edge of the disc and for stopping the disc from moving downwardly, each of said disc stoppers being displaceable in a vertical plane which is an extension of said disc accommodating portion;

designating means for designating a predetermined disc accommodating portion from among said plurality of disc accommodating portions by designating the address of said predetermined disc accommodating portion;

a reproducer part movable substantially in said second horizontal direction at a position below said disc accommodating mechanism, said reproducer part comprising a disc reproducer for playing a disc which is selected from said plurality of discs accommodated in said disc accommodating mechanism, an arm rotatable in the vertical plane which is an extension of said disc accommodating portion for carrying the disc between said disc accommodating mechanism and said disc reproducer to load and unload the selected disc to and from said disc reproducer, means for rotating said arm in opposite directions, disc stop cancelling means for cancelling a stopping action of a selected one of said plurality of disc stoppers corresponding to said selected disc which is accommodated within said predetermined disc accommodating portion by displacing said selected one disc stopper of said predetermined disc accommodating portion, and disc guide means for guiding the disc when said arm carries the disc between said disc accommodating mechanism and said disc reproducer; and movement control means for moving said reproducer part along said disc accommodating mechanism and for stopping said reproducer part at a position corresponding to said predetermined disc accommodating portion, said arm carrying said selected disc which is accommodated within said predetermined disc accommodating portion upwardly and downwardly while supporting a lower portion of the outer peripheral edge of said selected disc so that said arm carries said selected disc from said predetermined disc accommodating portion to said disc reproducer under the weight of said selected disc when said selected disc is to be played, and returns said selected disc into said predetermined disc accommodating portion by removing said selected disc from said disc reproducer after completion of the playing of said selected disc.

4. A reproducing apparatus as claimed in claim 3 in which each of said disc stoppers is rotatable about a shaft which is perpendicular to said vertical plane, and said shaft has such a shape and position that a rotating moment acting on said disc stopper due to the weight of the disc when said disc stopper stops the disc rotates said disc stopper in a direction to engage the disc.

* * * * *